(12) United States Patent
Batley et al.

(10) Patent No.: US 12,446,623 B2
(45) Date of Patent: Oct. 21, 2025

(54) CARTRIDGE-BASED HEAT NOT BURN VAPORIZER

(71) Applicant: JUUL Labs, Inc., Washington, DC (US)

(72) Inventors: Oliver J. Batley, Cambridge (GB); Adam Bowen, San Mateo, CA (US); Ian Garcia-Doty, Oakland, CA (US); Eddie G. Gonzalez, San Francisco, CA (US); Xenofon Kalogeropoulos, Cambridge (GB); James Monsees, San Francisco, CA (US); Andrew Newbold, Ixworth (GB); Paul R. Vieira, Oakland, CA (US)

(73) Assignee: JUUL Labs, Inc., Washington, DC (US)

( * ) Notice: Subject to any disclaimer, the term of this patent is extended or adjusted under 35 U.S.C. 154(b) by 630 days.

(21) Appl. No.: 17/687,496

(22) Filed: Mar. 4, 2022

(65) Prior Publication Data

US 2022/0183366 A1 Jun. 16, 2022

Related U.S. Application Data

(63) Continuation of application No. PCT/US2020/049547, filed on Sep. 4, 2020.
(Continued)

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/42* (2020.01); *H05B 3/34* (2013.01);
(Continued)

(58) Field of Classification Search
None
See application file for complete search history.

(56) References Cited

U.S. PATENT DOCUMENTS

| 3,373,915 A | 3/1968 | Anderson et al. |
| 3,559,655 A | 2/1971 | Briskin et al. |

(Continued)

FOREIGN PATENT DOCUMENTS

| CA | 3010559 A1 | 7/2017 |
| CN | 102753047 A | 10/2012 |

(Continued)

OTHER PUBLICATIONS

PCT/US2020/049547, Sep. 4, 2020, WO 2021/046452.
(Continued)

*Primary Examiner* — Katherine A Will
(74) *Attorney, Agent, or Firm* — Mintz Levin Cohn Ferris Glovsky and Popeo, P.C.

(57) ABSTRACT

A vaporizer device including a vaporizer cartridge configured to efficiently and effectively heat a non-liquid vaporizable material is described. The vaporizer cartridge may include a heating element configured to vaporize the vaporizable material by delivery of heat to the vaporizable material. The cartridge may include a cartridge contact in electrical communication with the heating element. The cartridge contact may be configured to couple to a receptacle contact along a vaporizer body of the vaporizer device having a power source to allow power to pass from the power source to the heating element. The heating element can include electrically resistive features such that current traveling along the heating element can cause the heating element to increase in temperature to within a desired temperature range. Related systems, methods, and articles of manufacture are also described.

19 Claims, 22 Drawing Sheets

Related U.S. Application Data

(60) Provisional application No. 62/897,087, filed on Sep. 6, 2019.

(51) Int. Cl.
 *A24F 40/42* (2020.01)
 *H05B 3/34* (2006.01)
 *A61M 15/06* (2006.01)

(52) U.S. Cl.
 CPC ....... *A61M 15/06* (2013.01); *H05B 2203/002* (2013.01); *H05B 2203/008* (2013.01)

(56) References Cited

U.S. PATENT DOCUMENTS

| | | | |
|---|---|---|---|
| 3,584,631 | A | 6/1971 | Halter et al. |
| 4,708,151 | A | 11/1987 | Shelar |
| 5,042,509 | A | 8/1991 | Banerjee et al. |
| 5,065,776 | A | 11/1991 | Lawson et al. |
| 5,249,586 | A | 10/1993 | Morgan et al. |
| 5,479,948 | A | 1/1996 | Counts et al. |
| 7,726,320 | B2 | 6/2010 | Robinson et al. |
| 8,490,629 | B1 | 7/2013 | Shenassa et al. |
| 8,671,952 | B2 | 3/2014 | Winterson et al. |
| 8,869,792 | B1 | 10/2014 | Lee |
| 8,991,402 | B2 | 3/2015 | Bowen et al. |
| 9,408,416 | B2 | 8/2016 | Monsees et al. |
| 9,603,389 | B2 | 3/2017 | Chen |
| 9,943,114 | B2 | 4/2018 | Batista |
| 10,512,285 | B2 | 12/2019 | Kuczaj |
| 10,729,179 | B2 | 8/2020 | Atkins et al. |
| 11,129,414 | B2 | 9/2021 | Atkins et al. |
| 11,147,128 | B2 | 10/2021 | Qiu |
| 11,197,497 | B2 | 12/2021 | Lee et al. |
| 11,464,082 | B2 | 10/2022 | Jobanputra et al. |
| 11,700,874 | B2 | 7/2023 | Alizon et al. |
| 12,010,782 | B2 | 6/2024 | Horrod et al. |
| 12,156,538 | B2 | 12/2024 | Leah et al. |
| 2004/0055613 | A1 | 3/2004 | Horian |
| 2005/0268911 | A1 | 12/2005 | Cross et al. |
| 2006/0032501 | A1 | 2/2006 | Hale et al. |
| 2007/0221234 | A1 | 9/2007 | Beckstead |
| 2007/0283972 | A1 | 12/2007 | Monsees et al. |
| 2008/0092912 | A1 | 4/2008 | Robinson et al. |
| 2009/0126746 | A1 | 5/2009 | Strickland et al. |
| 2009/0151717 | A1 | 6/2009 | Bowen et al. |
| 2009/0260642 | A1 | 10/2009 | Monsees et al. |
| 2010/0024834 | A1 | 2/2010 | Oglesby et al. |
| 2011/0041861 | A1 | 2/2011 | Sebastian et al. |
| 2011/0226236 | A1 | 9/2011 | Buchberger |
| 2011/0290267 | A1 | 12/2011 | Yamada et al. |
| 2013/0042865 | A1 | 2/2013 | Monsees et al. |
| 2014/0301721 | A1 | 10/2014 | Ruscio et al. |
| 2014/0366898 | A1 | 12/2014 | Monsees et al. |
| 2015/0272218 | A1 | 10/2015 | Chen |
| 2015/0335070 | A1 | 11/2015 | Sears et al. |
| 2016/0073692 | A1 | 3/2016 | Alarcon et al. |
| 2016/0120222 | A1 | 5/2016 | Bagai et al. |
| 2016/0120225 | A1 | 5/2016 | Mishra et al. |
| 2016/0120227 | A1 | 5/2016 | Levitz et al. |
| 2016/0295922 | A1* | 10/2016 | John ................. A24F 40/46 |
| 2016/0309782 | A1 | 10/2016 | Malgat et al. |
| 2016/0309789 | A1 | 10/2016 | Thomas, Jr. |
| 2016/0338412 | A1 | 11/2016 | Monsees et al. |
| 2017/0035116 | A1 | 2/2017 | Batista |
| 2017/0055575 | A1 | 3/2017 | Wilke et al. |
| 2017/0055580 | A1 | 3/2017 | Blandino et al. |
| 2017/0071250 | A1 | 3/2017 | Mironov et al. |
| 2017/0143041 | A1 | 5/2017 | Batista et al. |
| 2017/0156403 | A1 | 6/2017 | Gill et al. |
| 2017/0164657 | A1 | 6/2017 | Batista |
| 2018/0027877 | A1 | 2/2018 | Tucker et al. |
| 2018/0027883 | A1 | 2/2018 | Zuber et al. |
| 2018/0084823 | A1 | 3/2018 | Fuisz et al. |
| 2018/0110263 | A1 | 4/2018 | Borkovec et al. |
| 2018/0132534 | A1 | 5/2018 | Reevell |
| 2018/0177233 | A1 | 6/2018 | Tucker et al. |
| 2018/0228216 | A1 | 8/2018 | Saygili |
| 2018/0295881 | A1 | 10/2018 | Mironov et al. |
| 2018/0325179 | A1* | 11/2018 | Li ................. H05B 1/0252 |
| 2018/0343917 | A1 | 12/2018 | Sutton et al. |
| 2019/0001077 | A1 | 1/2019 | Xu et al. |
| 2019/0037921 | A1 | 2/2019 | Kennedy et al. |
| 2019/0098930 | A1 | 4/2019 | Fallon et al. |
| 2019/0124982 | A1 | 5/2019 | Atkins et al. |
| 2019/0166913 | A1 | 6/2019 | Trzecieski |
| 2019/0191769 | A1* | 6/2019 | Qiu ................. A24F 40/485 |
| 2019/0200674 | A1 | 7/2019 | Tucker et al. |
| 2019/0200677 | A1 | 7/2019 | Chong et al. |
| 2019/0208827 | A1 | 7/2019 | Mironov et al. |
| 2020/0093181 | A1 | 3/2020 | Hubbard et al. |
| 2020/0107585 | A1 | 4/2020 | Atkins et al. |
| 2020/0113245 | A1 | 4/2020 | Rosser et al. |
| 2020/0120993 | A1 | 4/2020 | Atkins et al. |
| 2020/0324066 | A1 | 10/2020 | Potter |
| 2021/0186113 | A1* | 6/2021 | Lee ................. A24F 40/57 |
| 2021/0321672 | A1* | 10/2021 | Wilke ................. A24C 5/01 |
| 2021/0386120 | A1 | 12/2021 | Gill |
| 2022/0030953 | A1 | 2/2022 | Woods et al. |
| 2022/0046997 | A1 | 2/2022 | Atkins et al. |
| 2022/0095685 | A1 | 3/2022 | Atkins et al. |
| 2022/0104550 | A1* | 4/2022 | Mao ................. A24F 40/10 |
| 2022/0151285 | A1 | 5/2022 | Garcia-Doty |
| 2022/0160040 | A1 | 5/2022 | Zhang et al. |
| 2022/0295894 | A1 | 9/2022 | Batista et al. |

FOREIGN PATENT DOCUMENTS

| | | |
|---|---|---|
| CN | 103783674 A | 5/2014 |
| CN | 105764367 A | 7/2016 |
| CN | 106307622 A | 1/2017 |
| CN | 106572705 A | 4/2017 |
| CN | 106659247 A | 5/2017 |
| CN | 106659250 A | 5/2017 |
| CN | 106858726 A | 6/2017 |
| CN | 107772540 A | 3/2018 |
| CN | 111432670 A | 7/2020 |
| CN | 113163855 A | 7/2021 |
| EP | 2394520 A1 | 12/2011 |
| EP | 3420829 A1 | 1/2019 |
| EP | 3664631 A2 | 6/2020 |
| EP | 3795009 A1 | 3/2021 |
| EP | 3829366 A1 | 6/2021 |
| GB | 2527597 A | 12/2015 |
| GB | 2547699 A | 8/2017 |
| GB | 2568411 B | 8/2019 |
| JP | S5138499 A | 3/1976 |
| JP | 2001-507576 A | 6/2001 |
| JP | 2010506594 A | 3/2010 |
| JP | 2010517568 A | 5/2010 |
| JP | 2010178730 A | 8/2010 |
| JP | 2013516159 A | 5/2013 |
| JP | 2015-509709 A | 4/2015 |
| JP | 2016538847 A | 12/2016 |
| JP | 2016538850 A | 12/2016 |
| JP | 2017018146 A | 1/2017 |
| JP | 2017520263 A | 7/2017 |
| JP | 2017-529896 A | 10/2017 |
| JP | 2017529848 A | 10/2017 |
| JP | 2017533732 A | 11/2017 |
| JP | 2020536536 A | 12/2020 |
| KR | 20-2012-0008751 U | 12/2012 |
| KR | 10-2016-0112769 A | 9/2016 |
| KR | 10-2021-0155091 A | 12/2021 |
| RU | 2602053 C2 | 11/2016 |
| RU | 2604313 C2 | 12/2016 |
| RU | 2629878 C1 | 9/2017 |
| RU | 2655239 C2 | 5/2018 |
| WO | WO-2006120570 A2 | 11/2006 |
| WO | WO-2011079932 A1 | 7/2011 |
| WO | WO-2013060743 A2 | 5/2013 |
| WO | WO-2015082651 A1 | 6/2015 |
| WO | WO-2015155289 A1 | 10/2015 |
| WO | WO-2015179388 A1 | 11/2015 |

(56) References Cited

FOREIGN PATENT DOCUMENTS

| | | |
|---|---|---|
| WO | WO-2016005533 A1 | 1/2016 |
| WO | WO-2016062777 A1 | 4/2016 |
| WO | WO-2016079589 A1 | 5/2016 |
| WO | WO-2016162446 A1 | 10/2016 |
| WO | WO-2017072148 A1 | 5/2017 |
| WO | WO-2017122196 A1 | 7/2017 |
| WO | WO-2017129617 A1 | 8/2017 |
| WO | WO-2017207418 A1 | 12/2017 |
| WO | WO-2017207419 A1 | 12/2017 |
| WO | WO-2017207582 A1 | 12/2017 |
| WO | WO-2018019578 A1 | 2/2018 |
| WO | WO-2018041065 A1 | 3/2018 |
| WO | WO-2018122389 A1 | 7/2018 |
| WO | WO-2018122978 A1 | 7/2018 |
| WO | WO-2018206615 A2 | 11/2018 |
| WO | WO-2019057942 A1 | 3/2019 |
| WO | WO-2019073237 A1 | 4/2019 |
| WO | WO-2019122015 A1 | 6/2019 |
| WO | WO-2020028591 A1 | 2/2020 |
| WO | WO-2020157814 A1 | 8/2020 |
| WO | WO-2020239599 A1 | 12/2020 |

OTHER PUBLICATIONS

Guo, et al. (Mar. 31, 2016) "Heat Transfer Performance of Atomizer of Electronic Cigar", Popular Science and Technology, 18(3):52-54.
(2015) "Property Tables and Charts (SI Units)", Wright State University, p. 865-892.

* cited by examiner

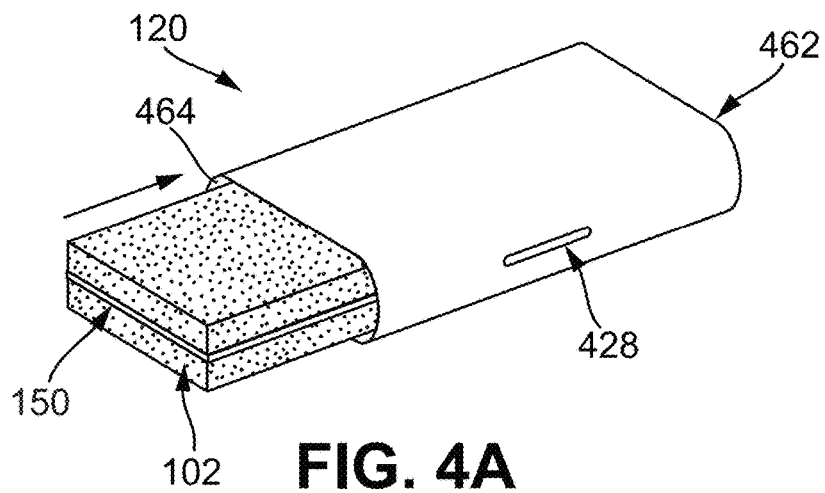
FIG. 4A
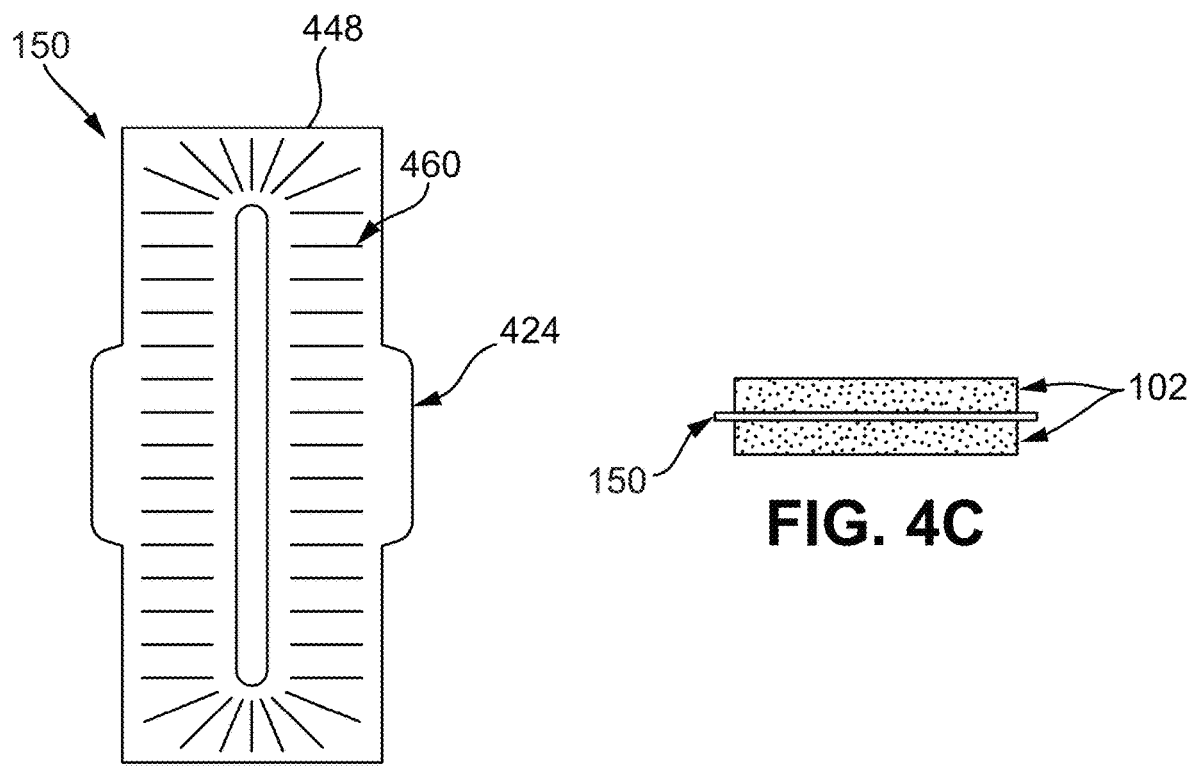
FIG. 4B
FIG. 4C

FIG. 14A  FIG. 14B

# CARTRIDGE-BASED HEAT NOT BURN VAPORIZER

CROSS-REFERENCE TO RELATED APPLICATION

This application is a bypass continuation and claims priority to PCT/US2020/049547, filed on Sep. 4, 2020 and entitled "CARTRIDGE-BASED HEAT NOT BURN VAPORIZER" which claims priority under 35 U.S.C. § 119(a) to U.S. Provisional application Ser. No. 62/897,087, filed on Sep. 6, 2019 and entitled "CARTRIDGE-BASED HEAT NOT BURN VAPORIZER," and claims priority under 35 U.S.C. § 119(a) to Greece Non-Provisional Application No. 20190100383, filed on Sep. 6, 2019 and entitled "CARTRIDGE-BASED HEAT NOT BURN VAPORIZER," the disclosures of which are incorporated by reference herein in their entirety.

TECHNICAL FIELD

The subject matter described herein relates to vaporizer devices, including a system for heating vaporizable material to generate an inhalable aerosol.

BACKGROUND

Vaporizer devices, which can also be referred to as vaporizers, electronic vaporizer devices, or e-vaporizer devices, can be used for delivery of an aerosol (for example, a vapor-phase and/or condensed-phase material suspended in a stationary or moving mass of air or some other gas carrier) containing one or more active ingredients by inhalation of the aerosol by a user of the vaporizing device. For example, electronic nicotine delivery systems (ENDS) include a class of vaporizer devices that are battery powered and that can be used to simulate the experience of smoking. Vaporizers are gaining increasing popularity both for prescriptive medical use, in delivering medicaments, and for consumption of tobacco, nicotine, and other plant-based materials. Vaporizer devices can be portable, self-contained, and/or convenient for use.

In use of a vaporizer device, the user inhales an aerosol, colloquially referred to as "vapor," which can be generated by a heating element that vaporizes a vaporizable material, for example, by causing the vaporizable material to transition at least partially to a gas phase. The vaporizable material may be a liquid, a solution, a solid, a paste, a wax, and/or any other form compatible for use with a specific vaporizer device. Moreover, the vaporizable material used with a vaporizer can be provided within a vaporizer cartridge, which may be a separable part of the vaporizer device that contains the vaporizable material and having an outlet (e.g., a mouthpiece) for delivering the aerosol generated by the vaporization of the vaporizable material to a user.

To receive the inhalable aerosol generated by a vaporizer device, a user may, in certain examples, activate the vaporizer device by taking a puff, by pressing a button, and/or by some other approach. A puff as used herein can refer to inhalation by the user in a manner that causes a volume of air to be drawn into the vaporizer device such that the inhalable aerosol is generated when the vaporized vaporizable material is combined with the volume of air.

An approach by which a vaporizer device generates an inhalable aerosol from a vaporizable material involves heating the vaporizable material in a vaporization chamber (e.g., a heater chamber) to cause the vaporizable material to be converted to the gas (or vapor) phase. A vaporization chamber can refer to an area or volume in the vaporizer device within which a heat source (for example, a conductive, convective, and/or radiative heat source) causes heating of a vaporizable material to produce a mixture of air and vaporized material to form a vapor for inhalation of the vaporizable material by a user of the vaporization device.

In some embodiments, vaporizer cartridges configured to heat solid vaporizable material (e.g. plant material such as tobacco leaves and/or parts of tobacco leaves) can require higher temperatures for inner tobacco regions to reach a minimum required temperature for vaporization. As a result, burning the solid vaporizable material at these high peak temperatures can produce undesirable byproducts (e.g., chemical elements or chemical compounds).

Vaporizer devices can be categorized into two classes, those that heat through conduction and those that heat through convection. For example, conduction-based vaporizer devices may be configured to vaporize liquid vaporizable material using a heating element contacting the liquid vaporizable material. As such, the liquid vaporizable material may contaminate the heating element, which can compromise performance of the vaporizer device. Some vaporizers may incorporate the heating element into the disposable part of the vaporizer device (e.g., the cartridge), such that the heating element may be replaced with each new cartridge and thereby limit, but not eliminate, heating element contamination. However, this can increase manufacturing labor and costs associated with the disposable. Furthermore, uniform heating of the vaporizable material in current conduction-based vaporizers may be difficult to achieve due to the low thermal conductivity of certain vaporizable materials (e.g., plant materials, such as tobacco).

Some vaporizable materials include plant materials, such as tobacco, and may have low thermal conductivity and thus be difficult to evenly heat. As a result, current vaporizer devices may try to overcome such heating difficulties by overheating the vaporizable material near the heater and underheating the vaporizable material further from the heater. Such uneven heating may result in unsatisfactory vapor production and/or an increased release of harmful or potentially harmful chemicals.

SUMMARY

Aspects of the current subject matter relate to a system for generating an inhalable aerosol. In one aspect, a system is described that includes a cartridge including vaporizable material and a heating element. The heating element can be configured to heat the vaporizable material within a predefined temperature range to generate the inhalable aerosol. Additionally, the heating element can contain the vaporizable material. The system can further include a vaporizer device body including a receptacle configured to releasably couple the cartridge. The vaporizer device body can also include a power source configured to supply power to the heating element when the cartridge is coupled to the vaporizer device body.

In some variations one or more of the following features can optionally be included in any feasible combination. For example, the heating element can be rolled into a spiral formation with the vaporizable material contained within the spiral formation. In some embodiments, the heating element can include a flexible sheet with a plurality of resistive heaters extending along the flexible sheet. In some embodiments, the heating element can include an electrically conductive sheet including a plurality of perforations configured to affect a resistance along the electrically conductive sheet. In some embodiments, the receptacle of the vaporizer device body can include rounded walls that receive the vaporizable material formed into a condensed rounded or elliptical shape. In some embodiments, the vaporizable material can be formed into a condensed cylindrical shape and the heating element can include at least one electrical contact extending around an outer surface of the cartridge. The at least one electrical contact can provide an electrical pathway between the power source of the vaporizer device body and the heating element. In some embodiments, the heating element can include an electrically resistive foam structure having a plurality of cells that are each configured to contain a part of the vaporizable material. The predefined temperature range can be approximately 25 degrees Celsius to approximately 250 degrees Celsius. In some embodiments, the vaporizable material includes a tobacco material. In some embodiments, the vaporizable material includes a non-liquid material.

In another aspect, a system for generating an inhalable aerosol is described that includes a cartridge. The cartridge can include a vaporizable material and a chamber configured to contain the vaporizable material. The cartridge can also include a heating element configured to heat the vaporizable material within a predefined temperature range to generate the inhalable aerosol. The heating element can extend within the chamber to allow three-dimensional heating of the vaporizable material contained in the chamber. The system can further include a vaporizer device body that includes a receptacle configured to releasably couple the cartridge. The vaporizer device body can also include a power source configured to supply power to the heating element when the cartridge is coupled to the vaporizer device body.

In some variations one or more of the following features can optionally be included in any feasible combination. For example, the heating element can include a single spiral component that is formed of electrically conductive material and/or thermally conductive material. In some embodiments, the heating element can include a pair of spiral conductive components that are formed of electrically conductive material and/or thermally conductive material. The heating element can include a plurality of folds along a length of the heating element that is formed of electrically conductive material and/or thermally conductive material. The heating element can include a plurality of perforations along the length of the conductive material to increase a resistance of the electrically conductive material. The heating element can include an electrically conductive sheet including at least one extension extending from a top side and/or a bottom side of the electrically conductive sheet, and the at least one extension can be configured to extend into the vaporizable material. The heating element can be positioned within the vaporizable material and in electrical communication with at least one electrical contact extending around an outer surface of the cartridge. The predefined temperature range can be approximately 25 degrees Celsius to approximately 250 degrees Celsius. The vaporizable material can include a tobacco material. The vaporizable material can include a non-liquid material.

In yet another aspect, a system for generating an inhalable aerosol is described that includes a cartridge including a vaporizable material. The cartridge can further include a heating element configured to heat the vaporizable material within a predefined temperature range to generate the inhalable aerosol. The heating element can include an induction coil and a ferrous material, and the ferrous material can be interspersed in the vaporizable material. The system can further include a vaporizer device body including a receptacle configured to releasably couple the cartridge. The vaporizer device body can also include a power source configured to supply power to the heating element when the cartridge is coupled to the vaporizer device body.

In some variations one or more of the following features can optionally be included in any feasible combination. For example, the predefined temperature range can be approximately 25 degrees Celsius to approximately 250 degrees Celsius. The vaporizable material can include a tobacco material. The vaporizable material can include a non-liquid material.

In another aspect, a system for generating an inhalable aerosol is described that includes a cartridge including a chamber. The cartridge can further include a vaporizable material formed into a shape having a first side and a second side opposing the first side. The vaporizable material can be positioned within the chamber. The cartridge can further include a heating element configured to heat the vaporizable material within a predefined temperature range to generate the inhalable aerosol. For example, the heating element can include a non-linear electrically conductive component that extends along a plane defined by a wall of the chamber. For example, the heating element can be positioned along the first side of the vaporizable material. The cartridge can also include a saturated component including a liquid for assisting in maintaining a moisture level of the vaporizable material, and the saturated component can be positioned along the second side of the vaporizable material. The system can further include a vaporizer device body including a receptacle configured to releasably couple the cartridge. The vaporizer device body can also include a power source configured to supply power to the heating element when the cartridge is coupled to the vaporizer device body.

In some variations one or more of the following features can optionally be included in any feasible combination. For example, the predefined temperature range can be approximately 25 degrees Celsius to approximately 250 degrees Celsius. The vaporizable material can include a tobacco material. The vaporizable material can include a non-liquid material. In some embodiments, the heating element can extend only along the plane defined by the wall of the chamber.

In another interrelated aspect of the current subject matter, a method includes coupling a cartridge to a vaporizer device body including a power source. The cartridge can include a vaporizable material and a heating element configured to heat the vaporizable material to generate the inhalable aerosol. The method can further include activating the heating element to heat the vaporizable material between a predefined temperature range to generate the inhalable aerosol. The predefined temperature range can be approximately 25 degrees Celsius to approximately 250 degrees Celsius.

In some variations one or more of the following features can optionally be included in any feasible combination. For example, the heating element can contain the vaporizable material. In some embodiments, the cartridge can include a chamber configured to contain the vaporizable material and the heating element can extend within the chamber to allow three-dimensional heating of the vaporizable material contained in the chamber. In some embodiments, the heating element can include an induction coil and a ferrous material interspersed in the vaporizable material. In some embodiments, the cartridge can further include a saturated component including a liquid for assisting in maintaining a moisture level of the vaporizable material. For example, the vaporizable material can be positioned between the saturated component and the heating element, and the heating element can include a non-linear electrically conductive component that extends along a plane defined by a wall of a chamber containing the vaporizable material.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 4A illustrates a top perspective view of another embodiment of the vaporizer cartridge including another embodiment of a heating element in contact with non-liquid vaporizable material;

FIG. 4B illustrates a top view of the heating element of the vaporizer cartridge of FIG. 4A;

FIG. 4C illustrates an end view of the heating element of FIG. 4B with a sheet of non-liquid vaporizable material coupled to top and bottom sides of the heating element;

FIG. 14A illustrates another embodiment of a heating element including a flat conductive sheet;

FIG. 14B illustrates the heating element of FIG. 14A with a plurality of formed vaporizable material positioned along the heating element;

When practical, similar reference numbers denote similar structures, features, or elements.

DETAILED DESCRIPTION

Figure 1:
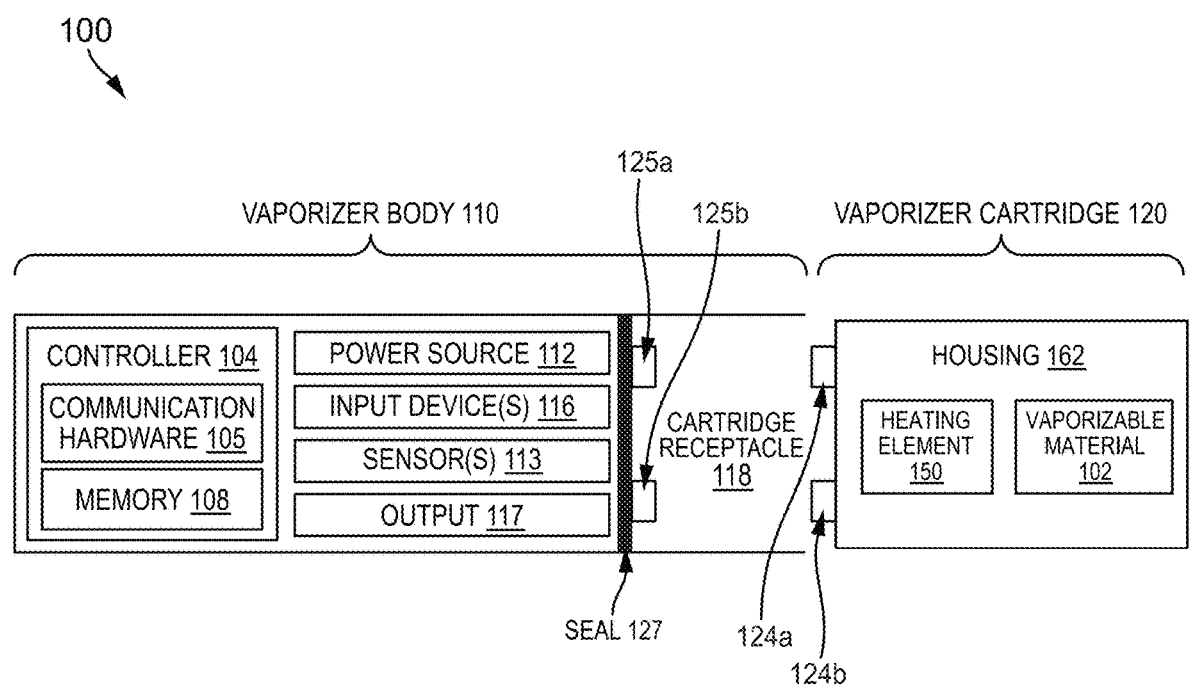
FIG. 1 illustrates a block diagram of a vaporizer device consistent with implementations of the current subject matter.

Implementations of the current subject matter include methods, apparatuses, articles of manufacture, and systems relating to vaporization of one or more materials for inhalation by a user. Example implementations include vaporizer devices and systems including vaporizer devices. The term "vaporizer device" as used in the following description and claims refers to any of a self-contained apparatus, an apparatus that includes two or more separable parts (for example, a vaporizer body that includes a battery and other hardware, and a cartridge that includes a vaporizable material), and/or the like. A "vaporizer system," as used herein, can include one or more components, such as a vaporizer device. Examples of vaporizer devices consistent with implementations of the current subject matter include electronic vaporizers, electronic nicotine delivery systems (ENDS), and/or the like. In general, such vaporizer devices are hand-held devices that heat a vaporizable material to provide an inhalable dose of the material.

The various heater element embodiments described herein can improve the efficiency and quality of heating of the vaporizable material, such as heating the vaporizable material within a predefined temperature range. Such temperature range includes a temperature that is hot enough to vaporize the vaporizable material into an aerosol for inhalation, while also heating below a temperature that produces harmful or potentially harmful byproducts.

In some embodiments, the heating elements described herein can achieve temperatures within the desired predefined temperature range at a rate that allows a user to have an enjoyable user experience (e.g., not have to wait a long time for the heating element to reach a temperature in the predefined heating range, etc.). In some embodiments, the vaporizer cartridges including such heating elements can be cost effectively manufactured, thereby making them economically feasible as single-use disposable cartridges. Various vaporizer cartridges and heating elements including one or more of the above features are described in greater detail below.

The vaporizable material used with a vaporizer device can be provided within a cartridge (for example, a part of the vaporizer device that contains the vaporizable material in a reservoir or other container) which can be refillable when empty, or disposable such that a new cartridge containing additional vaporizable material of a same or different type can be used). A vaporizer device can be a cartridge-using vaporizer device, a cartridge-less vaporizer device, or a multi-use vaporizer device capable of use with or without a cartridge.

For example, a vaporizer device can include a heating chamber (for example, an oven or other region in which material is heated by a heating element) configured to receive a vaporizable material directly into the heating chamber, and/or a reservoir or the like for containing the vaporizable material. In some implementations, a vaporizer device can be configured for use with a liquid vaporizable material (for example, a carrier solution in which an active and/or inactive ingredient(s) are suspended or held in solution, or a liquid form of the vaporizable material itself), a paste, a wax, and/or a solid vaporizable material. A solid vaporizable material can include a plant material that emits some part of the plant material as the vaporizable material (for example, some part of the plant material remains as waste after the material is vaporized for inhalation by a user) or optionally can be a solid form of the vaporizable material itself, such that all of the solid material can eventually be vaporized for inhalation. A liquid vaporizable material can likewise be capable of being completely vaporized, or can include some portion of the liquid material that remains after all of the material suitable for inhalation has been vaporized.

Referring to the block diagram of FIG. 1, a vaporizer device 100 typically includes a power source 112 (such as a battery which may be a rechargeable battery), and a controller 104 (e.g., a processor, circuitry, etc. capable of executing logic) for controlling delivery of power to a heating element to cause a vaporizable material to be converted from a condensed form (e.g., a solid, a liquid, a solution, a suspension, a part of an at least partially unprocessed plant material, etc.) to the gas phase. The controller 104 may be part of one or more printed circuit boards (PCBs) consistent with certain implementations of the current subject matter. In the current subject matter, which generally relates to devices for producing an inhalable aerosol through heating of a vaporizable material 102 without burning it, the condensed form is typically a plant-based material, at least part of which is a vaporizable material capable of being converted to vapor under heating of the plant-based material.

After conversion of the vaporizable material 102 to the gas phase, at least some of the vaporizable material 102 in the gas phase can condense to form particulate matter in at least a partial local equilibrium with the gas phase as part of an aerosol, which can form some or all of an inhalable dose provided by the vaporizer device 100 during a user's puff or draw on the vaporizer device 100. It should be appreciated that the interplay between gas and condensed phases in an aerosol generated by a vaporizer device 100 can be complex and dynamic, due to factors such as ambient temperature, relative humidity, chemistry, flow conditions in airflow paths (both inside the vaporizer and in the airways of a human or other animal), and/or mixing of the vaporizable material 102 in the gas phase or in the aerosol phase with other air streams, which can affect one or more physical parameters of an aerosol. In some vaporizer devices, and particularly for vaporizer devices configured for delivery of volatile vaporizable materials, the inhalable dose can exist predominantly in the gas phase (for example, formation of condensed phase particles can be very limited).

As noted above, vaporizer devices 100 consistent with implementations of the current subject matter may also or alternatively be configured to create an inhalable dose of gas-phase and/or aerosol-phase vaporizable material via heating of a non-liquid vaporizable material 102, which can include, for example, a solid-phase vaporizable material or plant material (e.g., tobacco leaves and/or parts of tobacco leaves). For example, the heating element 150 may be part of or otherwise incorporated into or in thermal contact with the walls of an oven or other heating chamber into which the non-liquid vaporizable material 102 is placed. In some embodiments, the heating element 150 may be used to heat air passing through or past the non-liquid vaporizable material to thereby heat and vaporize at least a part of the vaporizable material 102. In still other examples, a heating element 150 or elements may be disposed in intimate contact with the vaporizable material 102 such that direct thermal conduction heating of the vaporizable material 102 occurs from within a mass of the vaporizable material 102 (e.g., as opposed to only by conduction inward from walls of an oven). Such non-liquid vaporizable materials 102 may be used with cartridge using or cartridge less vaporizer devices 100.

The heating element 150 can be or include one or more of a conductive heater, a radiative heater, and a convective heater. One type of heating element 150 is a resistive heating element, which can be constructed of or at least include a material (e.g., a metal or alloy, for example a nickel-chromium alloy, or a non-metallic resistor) configured to dissipate electrical power in the form of heat when electrical current is passed through one or more resistive segments of the heating element 150. In some implementations of the current subject matter, the heating element 150 includes a resistive heating element that can be wrapped around, positioned within, integrated into a bulk shape of, pressed into thermal contact with, or otherwise arranged to deliver heat to a mass of vaporizable material 102, which can include a plant based-substance such as tobacco.

In some embodiments, the heating element 150 may be activated in association with a user puffing (e.g., drawing, inhaling, etc.) on a mouthpiece of the vaporizer device 100 to cause air to flow from an air inlet, along an airflow path that passes the heating element 150 and an associated mass of the vaporizable material 102, optionally through one or more condensation areas or chambers, to an air outlet in the mouthpiece. Incoming air passing along the airflow path may pass over and/or though the heating element 150 and the vaporizable material 102, where gas phase vaporizable material is entrained into the air. As noted herein, the entrained vaporizable material 102 in the gas phase can condense as it passes through the remainder of the airflow path such that an inhalable dose of the vaporizable material 102 in an aerosol form can be delivered from the air outlet (e.g., in a mouthpiece for inhalation by a user).

Activation of the heating element 150 can be caused by automatic detection of a puff based on one or more signals generated by one or more sensor 113. The sensor 113 and the signals generated by the sensor 113 can include one or more of: a pressure sensor or sensors disposed to detect pressure along the airflow path relative to ambient pressure (or optionally to measure changes in absolute pressure), a motion sensor or sensors (for example, an accelerometer) of the vaporizer device 100, a flow sensor or sensors of the vaporizer device 100, a capacitive lip sensor of the vaporizer device 100, detection of interaction of a user with the vaporizer device 100 via one or more input devices 116 (for example, buttons or other tactile control devices of the vaporizer device 100), receipt of signals from a computing device in communication with the vaporizer device 100, and/or via other approaches for determining that a puff is occurring or imminent.

As discussed herein, the vaporizer device 100 consistent with implementations of the current subject matter can be configured to connect (such as, for example, wirelessly or via a wired connection) to a computing device (or optionally two or more devices) in communication with the vaporizer device 100. To this end, the controller 104 can include communication hardware 105. The controller 104 can also include a memory 108. The communication hardware 105 can include firmware and/or can be controlled by software for executing one or more cryptographic protocols for the communication.

A computing device can be a component of a vaporizer system that also includes the vaporizer device 100, and can include its own hardware for communication, which can establish a wireless communication channel with the communication hardware 105 of the vaporizer device 100. For example, a computing device used as part of a vaporizer system can include a general-purpose computing device (such as a smartphone, a tablet, a personal computer, some other portable device such as a smartwatch, or the like) that executes software to produce a user interface for enabling a user to interact with the vaporizer device 100. In other implementations of the current subject matter, such a device used as part of a vaporizer system can be a dedicated piece of hardware such as a remote control or other wireless or wired device having one or more physical or soft (i.e., configurable on a screen or other display device and selectable via user interaction with a touch-sensitive screen or some other input device like a mouse, pointer, trackball, cursor buttons, or the like) interface controls. The vaporizer device 100 can also include one or more outputs 117 or devices for providing information to the user. For example, the outputs 117 can include one or more light emitting diodes (LEDs) configured to provide feedback to a user based on a status and/or mode of operation of the vaporizer device 100.

In the example in which a computing device provides signals related to activation of the resistive heating element, or in other examples of coupling of a computing device with the vaporizer device 100 for implementation of various control or other functions, the computing device executes one or more computer instruction sets to provide a user interface and underlying data handling. In one example, detection by the computing device of user interaction with one or more user interface elements can cause the computing device to signal the vaporizer device 100 to activate the heating element to reach an operating temperature for creation of an inhalable dose of vapor/aerosol. Other functions of the vaporizer device 100 can be controlled by interaction of a user with a user interface on a computing device in communication with the vaporizer device 100.

In the example in which a computing device provides signals related to activation of the resistive heating element 150, or in other examples of coupling of a computing device with the vaporizer device 100 for implementation of various control or other functions, the computing device executes one or more computer instructions sets to provide a user interface and underlying data handling. In one example, detection by the computing device of user interaction with one or more user interface elements can cause the computing device to signal the vaporizer 100 to activate the heating element 150 to heat to a temperature within a predefined operating temperature for creation of an inhalable dose of vapor/aerosol. Other functions of the vaporizer may be controlled by interaction of a user with a user interface on a computing device in communication with the vaporizer.

The temperature of the heating element 150 including electrically resistive elements (e.g., a resistive heating element) of the vaporizer device may depend on a number of factors, including an amount of electrical power delivered to the resistive heating element 150 and/or a duty cycle at which the electrical power is delivered, conductive heat transfer to other parts of the vaporizer device 100 and/or to the environment, latent heat losses due to vaporization of a vaporizable material from the atomizer as a whole, and convective heat losses due to airflow (e.g., air moving across the heating element or the atomizer as a whole when a user inhales on the electronic vaporizer).

As noted herein, to reliably activate the heating element 150 or heat the heating element 150 to a temperature within the predefined temperature range, the vaporizer device 100 may, in some implementations of the current subject matter, make use of signals from the sensor 113 (for example, a pressure sensor) to determine when a user is inhaling. The sensor 113 can be positioned in the airflow path and/or can be connected (for example, by a passageway or other path) to an airflow path containing an inlet for air to enter the vaporizer device 100 and an outlet via which the user inhales the resulting vapor and/or aerosol such that the sensor 113 experiences changes (for example, pressure changes) concurrently with air passing through the vaporizer device 100 from the air inlet to the air outlet. In some implementations of the current subject matter, the heating element 150 can be activated in association with a user's puff, for example by automatic detection of the puff, or by the sensor 113 detecting a change (such as a pressure change) in the airflow path.

The sensor 113 can be positioned on or coupled to (i.e., electrically or electronically connected, either physically or via a wireless connection) the controller 104 (for example, a printed circuit board assembly or other type of circuit board). To take measurements accurately and maintain durability of the vaporizer device 100, it can be beneficial to provide a seal 127 resilient enough to separate an airflow path from other parts of the vaporizer device 100. The seal 127, which can be a gasket, can be configured to at least partially surround the sensor 113 such that connections of the sensor 113 to the internal circuitry of the vaporizer device 100 are separated from a part of the sensor 113 exposed to the airflow path. In an example of a cartridge-based vaporizer, the seal 127 can also separate parts of one or more electrical connections between the vaporizer body 110 and the vaporizer cartridge 120. Such arrangements of the seal 127 in the vaporizer device 100 can be helpful in mitigating against potentially disruptive impacts on vaporizer components resulting from interactions with environmental factors such as water in the vapor or liquid phases, other fluids such as the vaporizable material 102, etc., and/or to reduce the escape of air from the designated airflow path in the vaporizer device 100. Unwanted air, liquid or other fluid passing and/or contacting circuitry of the vaporizer device 100 can cause various unwanted effects, such as altered pressure readings, and/or can result in the buildup of unwanted material, such as moisture, excess vaporizable material 102, etc., in parts of the vaporizer device 100 where they can result in poor pressure signal, degradation of the sensor 113 or other components, and/or a shorter life of the vaporizer device 100. Leaks in the seal 127 can also result in a user inhaling air that has passed over parts of the vaporizer device 100 containing, or constructed of, materials that may not be desirable to be inhaled.

In some implementations, the vaporizer body 110 includes the controller 104, the power source 112 (for example, a battery), one more of the sensor 113, charging contacts (such as those for charging the power source 112), the seal 127, and a cartridge receptacle 118 configured to receive the vaporizer cartridge 120 for coupling with the vaporizer body 110 through one or more of a variety of attachment structures. In some examples, the vaporizer cartridge 120 includes chamber for containing the vaporizable material 102, and the mouthpiece can have an aerosol outlet for delivering an inhalable dose to a user. In some examples, vaporizer cartridge 120 includes a mouthpiece for delivering an inhalable dose to a user. The vaporizer body 110 can include the heating element 150, or alternatively, the heating element 150 can be part of the vaporizer cartridge 120.

As noted above, the current subject matter relates to cartridge-based configurations for vaporizers that generate an inhalable dose of a vaporizable material via heating of a vaporizable material 102, such as a non-liquid vaporizable material. For example, a vaporizer cartridge 120 may include a mass of a vaporizable material 102 that is processed and formed to have direct contact with parts of one or more resistive heating elements 150, and such a vaporizer cartridge 120 may be configured to be coupled mechanically and electrically to a vaporizer body 110 that includes at least the controller 104, the power source 112.

In an embodiment of the vaporizer device 100 in which the power source 112 is part of the vaporizer body 110, and a heating element 150 is disposed in the vaporizer cartridge 120 and configured to couple with the vaporizer body 110, the vaporizer device 100 can include electrical connection features (for example, means for completing a circuit) for completing a circuit that includes the controller 104 (for example, a printed circuit board, a microcontroller, or the like), the power source 112, and the heating element 150. These features can include one or more contacts (referred to herein as cartridge contacts 124a and 124b) on a bottom surface of the vaporizer cartridge 120 and one or more contacts (referred to herein as receptacle contacts 125a and 125b) disposed near a base of the cartridge receptacle 118 of the vaporizer body 101 such that the cartridge contacts 124a and 124b and the receptacle contacts 125a and 125b make electrical connections when the vaporizer cartridge 120 is coupled with the cartridge receptacle 118 of the vaporizer body 110. The circuit completed by these electrical connections can allow delivery of electrical current from the power source 112 to the heating element 150 and can further be used for additional functions, such as measuring a resistance of the heating element 150 for use in determining and/or controlling a temperature of the heating element 150 based on a thermal coefficient of resistivity of the heating element 150.

Other configurations in which a vaporizer cartridge 120 is coupled to a vaporizer body 110 without being inserted into a cartridge receptacle 118 are also within the scope of the current subject matter. It will be understood that the references herein to "receptacle contacts" can more generally refer to contacts on a vaporizer body 110 that are not contained within a cartridge receptacle 118 but are nonetheless configured to make electrical connections with the cartridge contacts 124a and 124b of a vaporizer cartridge 120 when the vaporizer cartridge 120 and the vaporizer body 110 are coupled.

In some implementations of the current subject matter, the cartridge contacts 124a and 124b and the receptacle contacts 125a and 125b can be configured to electrically connect in either of at least two orientations. In other words, one or more circuits necessary for operation of the vaporizer device 100 can be completed by insertion of the vaporizer cartridge 120 into the cartridge receptacle 118 in a first rotational orientation (around an axis along which the vaporizer cartridge 120 is inserted into the cartridge receptacle 118 of the vaporizer body 110) such that the cartridge contact 124*a* is electrically connected to the receptacle contact 125*a* and the cartridge contact 124*b* is electrically connected to the receptacle contact 125*b*. Furthermore, the one or more circuits necessary for operation of the vaporizer device 100 can be completed by insertion of the vaporizer cartridge 120 in the cartridge receptacle 118 in a second rotational orientation such cartridge contact 124*a* is electrically connected to the receptacle contact 125*b* and cartridge contact 124*b* is electrically connected to the receptacle contact 125*a*.

In one example of an attachment structure for coupling the vaporizer cartridge 120 to the vaporizer body 110, the vaporizer body 110 includes one or more detents (for example, dimples, protrusions, etc.) protruding inwardly from an inner surface of the cartridge receptacle 118, additional material (such as metal, plastic, etc.) formed to include a portion protruding into the cartridge receptacle 118, and/or the like. One or more exterior surfaces of the vaporizer cartridge 120 can include corresponding recesses (not shown in FIG. 1A) that can fit and/or otherwise snap over such detents or protruding portions when the vaporizer cartridge 120 is inserted into the cartridge receptacle 118 on the vaporizer body 110. When the vaporizer cartridge 120 and the vaporizer body 110 are coupled (e.g., by insertion of the vaporizer cartridge 120 into the cartridge receptacle 118 of the vaporizer body 110), the detents or protrusions of the vaporizer body 110 can fit within and/or otherwise be held within the recesses of the vaporizer cartridge 120, to hold the vaporizer cartridge 120 in place when assembled. Such an assembly can provide enough support to hold the vaporizer cartridge 120 in place to ensure good contact between the cartridge contacts 124*a* and 124*b* and the receptacle contacts 125*a* and 125*b*, while allowing release of the vaporizer cartridge 120 from the vaporizer body 110 when a user pulls with reasonable force on the vaporizer cartridge 120 to disengage the vaporizer cartridge 120 from the cartridge receptacle 118.

Further to the discussion above regarding the electrical connections between the vaporizer cartridge 120 and the vaporizer body 110 being reversible such that at least two rotational orientations of the vaporizer cartridge 120 in the cartridge receptacle 118 are possible, in some embodiments of the vaporizer device 100, the shape of the vaporizer cartridge 120, or at least a shape of the insertable end 122 of the vaporizer cartridge 120 that is configured for insertion into the cartridge receptacle 118, can have rotational symmetry of at least order two. In other words, the vaporizer cartridge 120 or at least the insertable end 122 of the vaporizer cartridge 120 can be symmetrical upon a rotation of 180° around an axis along which the vaporizer cartridge 120 is inserted into the cartridge receptacle 118. In such a configuration, the circuitry of the vaporizer device 100 can support identical operation regardless of which symmetrical orientation of the vaporizer cartridge 120 occurs.

In some implementations, the vaporizer cartridge 120, or at least an insertable end 122 of the vaporizer cartridge 120 configured for insertion in the cartridge receptacle 118, can have a non-circular cross section transverse to the axis along which the vaporizer cartridge 120 is inserted into the cartridge receptacle 118. For example, the non-circular cross section can be approximately rectangular, approximately elliptical (i.e., have an approximately oval shape), non-rectangular but with two sets of parallel or approximately parallel opposing sides (i.e., having a parallelogram-like shape), or other shapes having rotational symmetry of at least order two. In this context, approximate shape indicates that a basic likeness to the described shape is apparent, but that sides of the shape in question need not be completely linear and vertices need not be completely sharp. Rounding of both or either of the edges or the vertices of the cross-sectional shape is contemplated in the description of any non-circular cross section referred to herein.

The cartridge contacts 124*a* and 124*b* and the receptacle contacts 125*a* and 125*b* can take various forms. For example, one or both sets of electrical contacts can include conductive pins, tabs, posts, receiving holes for pins or posts, or the like. Some types of electrical contacts can include springs or other features to facilitate better physical and electrical contact between the cartridge contacts 124*a* and 124*b* and the receptacle contacts 125*a* and 125*b*. The electrical contacts can optionally be gold-plated, and/or include other materials.

Various embodiments of a vaporizer cartridge 120 are described herein that are configured for containing and vaporizing one or more non-liquid vaporizable materials 102, such as loose-leaf tobacco. Furthermore, such embodiments of vaporizer cartridges 120 may be single-use such that they are not refillable after the vaporizable material has been used up. Such single-use vaporizer cartridges 120 may thus require inexpensive material and manufacturing in order to be economically feasible. Furthermore, although it may be desirable to make and manufacture single-use vaporizer cartridges for vaporizing non-liquid vaporizable material 102, it is also desirable to efficiently and effectively vaporize the vaporizable material 102. For example, a user inhaling on the vaporizer device 100 typically prefers inhaling aerosol created by the vaporizer device shortly after engaging with the vaporizer device (e.g., placing lips on mouthpiece, pushing an activation button, etc.). As such, the embodiments of the vaporizer cartridges 120 disclosed herein may beneficially achieve efficient vaporization of vaporizable material 102 to achieve a desired user experience. Furthermore, embodiments of the vaporizer cartridge 120 disclosed herein may advantageously provide sufficient heat energy to the vaporizable material 102 to create an aerosol form of the vaporizable material for inhalation, while also sufficiently limiting heating to at least reduce creation of at least one harmful byproduct that is not desired for a user to inhale. To achieve the above, various embodiments of heating elements are disclosed and described in greater detail below.

For example, various embodiments of heating elements 150 are described herein that are configured to heat within a desired predefined temperature range, such as at or below approximately 250 degrees Celsius and above approximately 25 degrees Celsius. Such a temperature range may advantageously vaporize a vaporizable material 102 (e.g., processed tobacco) and allow at least part of the vaporizable material (e.g., nicotine and volatile flavor compounds) to be aerosolized and delivered to a user puffing on the associated vaporization device 100. Such a temperature within the desired predefined temperature range may also prevent the creation of at least one harmful or potentially harmful byproduct. As such, at least one benefit of the vaporizer devices 100 described herein include the improved quality of aerosol for inhalation by a user.

In addition, various embodiments of the heating element 150 described herein may efficiently heat up to a temperature within the desired predefined temperature range, which can also result in efficient heating of adjacent vaporizable material within the predefined temperature range. This can allow the vaporizer device 100 to achieve a desired user experience for the user of the vaporizer device 100. Additionally, efficient heat-up time can result in efficient power usage, such as battery power from the vaporizer device 100. Furthermore, the various embodiments of the heating elements 150 described herein can achieve such benefits while not requiring an increase in size of the vaporizer device 100. In some embodiments, the heating element 150 can allow for a more compact vaporizer device 100 than what is currently available. In addition, embodiments of the heating element 150 can be made and manufactured at a cost that may allow the vaporizer cartridge 120 to be single-use and economically feasible.

Embodiments of the heating elements 150 described below can include at least one thermally conductive material, such as carbon, carbon foam, metal, metal foil, aluminum foam, or a biodegradable polymer. The energy provided by a vaporizer device 100 to the thermally conductive material (e.g., via the cartridge contacts 124a, 124b and cartridge receptacle contacts 125a, 125b) can cause an increase in temperature along at least a part of the thermally conductive material, such as for vaporizing the vaporizable material 102. The vaporizer body 110 can include a controller 104 that can control the amount of energy provided to the thermally conductive material of the heating element 150, thereby assisting the heating element 150 with reaching a temperature that is within the desired temperature range. Various sensors 113, such as one or more sensors positioned within the vaporizer body 110 and/or vaporizer cartridge 120, can be configured to measure a current, resistance, and/or temperature associated with the heating element 150. One or more sensors 120 can also be configured to sense a temperature of the vaporizable material 102.

In some embodiments, a vaporizer cartridge 120 can include a housing 162 configured to contain at least some of the vaporizable material 102 and/or heating element 150. The housing 162 can be made out of one or more of a variety of materials, such as a plastic material, a paper material, a metal material, etc. In some embodiments, at least some of the housing 162 can be vaporizable and/or biodegradable. In some embodiments, the housing 162 can include the heating element 150.

Figure 2A:
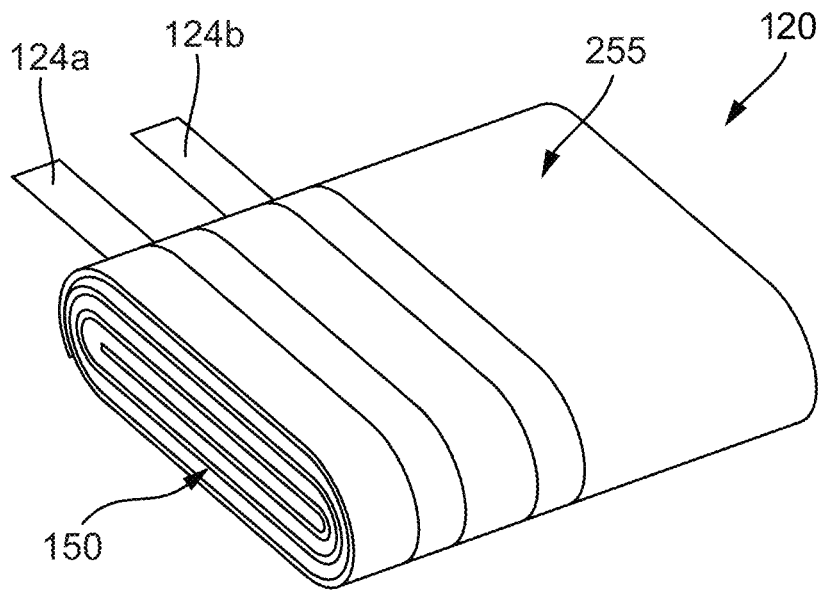
FIG. 2A illustrates a perspective view of an embodiment of a vaporizer cartridge including an embodiment of a heating element having a flexible sheet with electrically conductive traces extending therealong.
Figure 2B:
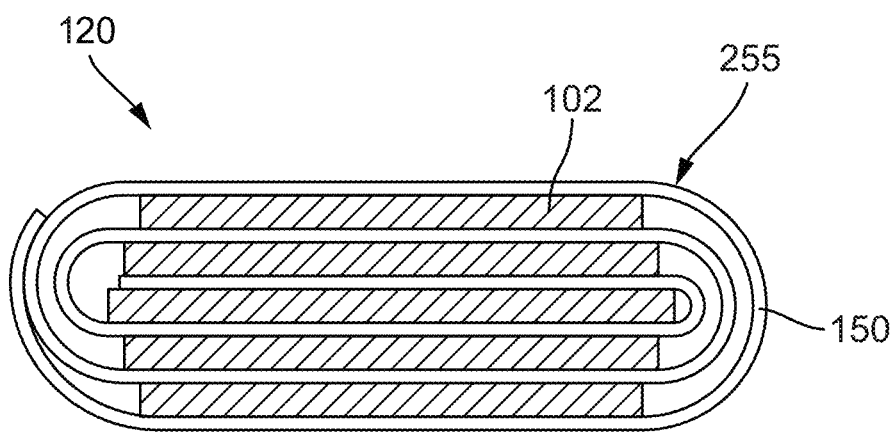
FIG. 2B illustrates an end view of the vaporizer cartridge of FIG. 2A showing the flexible sheet of the heating element wrapped around non-liquid vaporizable material.

FIGS. 2A-2B illustrate an embodiment of the vaporizer cartridge 120 that can be used with an embodiment of the vaporizer body 110. As show in FIGS. 2A and 2B, the vaporizer cartridge 120 can include the heating element 150, and the heating element 150 can be wrapped around and at least partly contain the vaporizable material 102. For example, the heating element 150 can include a flexible sheet 255 including one or more features extending along all or part of the flexible sheet 255, such as electrically conductive traces 252 described with respect to FIGS. 2C and 2D.

In some embodiments, the heating element 150 can wrap around and/or contain non-liquid vaporizable material 102, such as a plurality of sheets of vaporizable material 102 (e.g., formed sheets of tobacco), as shown in FIG. 2B. For example, the heating element 150 can form a cylindrical and/or flattened spiral shape with one or more sheets of vaporizable material 102 that are each positioned between two different parts of the heating element 150. For example, different first and second lengths of the heating element 150 can extend along opposing sides of each sheet of vaporizable material 102, such as resulting from the spiral shape configuration of the heating element 150. In some embodiments, the vaporizable material 102 can include one continuous sheet that extends along and contained within the spiraled heating element 150. The heating element 150 can define a chamber (e.g., space within the spiraled heating element 150) configured to contain the vaporizable material 102, as well as heat the vaporizable material 102 within the chamber. Such a configuration can increase the contact between the vaporizable material 102 and the heating element 150, thereby allowing the heating element 150 to efficiently heat up and vaporize the vaporizable material 102. Furthermore, a thermal gradient across the vaporizable material 102 can be minimal (e.g., less than or equal to the width of a tobacco sheet) in such a configuration. This can allow the heating element 150 to efficiently heat the vaporizable material 102 to a temperature within the desired predefined temperature range while also efficiently vaporizing an acceptable fraction (ideally but not necessarily all or substantially all) of the vaporizable material 102 in the chamber.

Figure 2C:
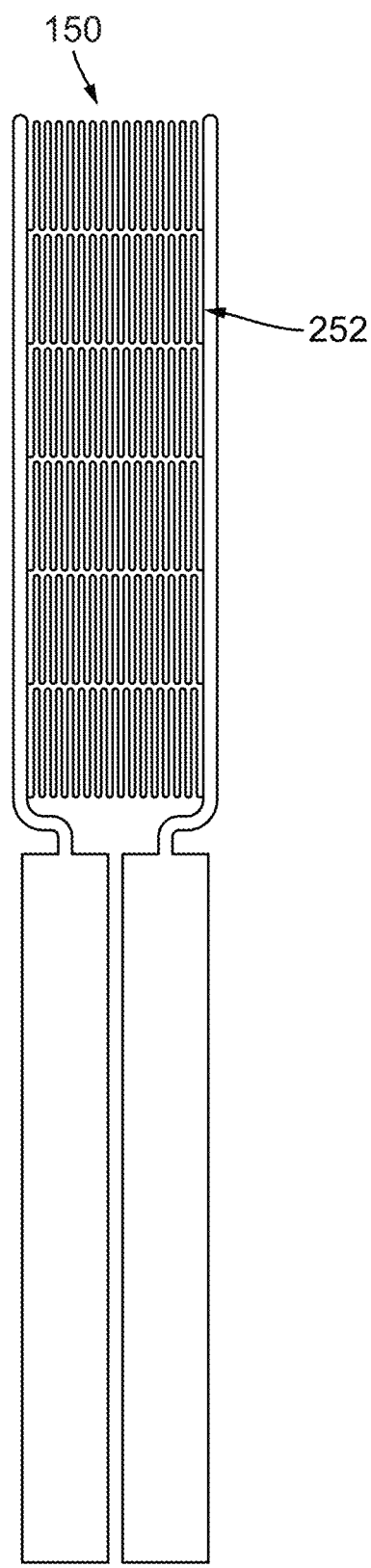
FIG. 2C illustrates a top view of an embodiment of the electrically conductive traces of the heating element of FIG. 2A showing a plurality of electrically conductive traces forming six series heaters in parallel, and with each series heater portion in a horizontal orientation.
Figure 2D:
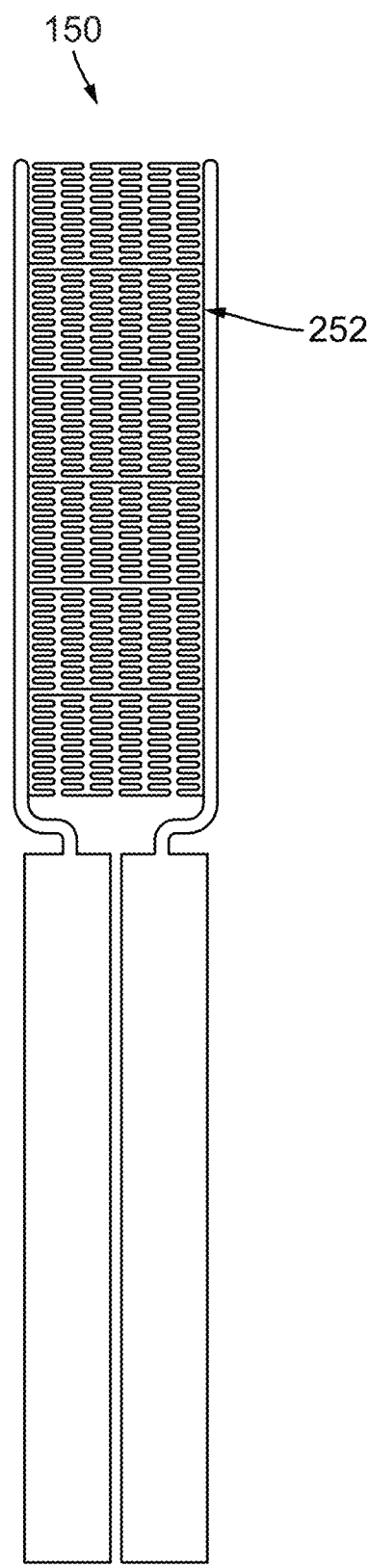
FIG. 2D illustrates a top view of an embodiment of the electrically conductive traces of the heating element of FIG. 2A showing a plurality of electrically conductive traces forming six series heaters in parallel, and with each series heater portion in a vertical orientation.

FIGS. 2C and 2D illustrate embodiments of electrically conductive traces 252 that can extend along and form at least a part of the heating element 150, such as extend along one or both sides of the flexible sheet 255. For example, the electrically conductive traces 252 can extend along at least a side of the flexible sheet 255 that contacts vaporizable material 102 and the flexible sheet 255 can be made out of a non-electrically conductive material. These electrically conductive traces 252 can from resistive heaters, which can be arranged in series or parallel. The electrically conductive traces 252 can be made out of an electrically conductive material, such as any of the electrically conductive materials described herein. The heating element 150 can include cartridge contacts 124a and 124b that are in electrical communication with the electrically conductive traces 252. For example, the cartridge contacts 124a and 124b can be positioned such that when the vaporizer cartridge 120 is coupled to the vaporizer body 110, the cartridge contacts 124a and 124b can mate with the receptacle contacts 125a and 125b of the cartridge receptacle 118 of the vaporizer body 110. This can allow energy from the power source 112 of the vaporizer body 110 to be delivered to the electrically conductive traces 252 (via the contact between the cartridge contacts 124a and 124b and the receptacle contacts 125a and 125b) thereby allowing the electrically conductive traces 252 to reach a temperature within the desired temperature range.

For example, as shown in FIGS. 2C and 2D, the electrically conductive traces 252 can include a plurality of series heaters in parallel, such as six series heaters positioned in parallel. Additionally, each series heater can be laid out in a horizontal orientation (as shown in FIG. 2C) and/or in a vertical orientation (as shown in FIG. 2D). For example, the horizontal orientation can provide a series resistance of approximately 2.18 Ohm at 25° C. and 4.09 Ohm at 250° C. and total heater resistance of approximately 0.363 Ohm at 25° C. and 0.682 Ohm at 250° C. In the vertical orientation, for example, the series resistance of approximately 2.14 Ohm at 25° C. and 4.02 Ohm at 250° C. can be achieved. Additionally, the vertical orientation can achieve, for example, a total heater resistance of approximately 0.357 Ohm at 25° C. and 0.670 Ohm at 250° C. Other configurations of the electrically conductive traces are within the scope of this disclosure.

Figure 3A:
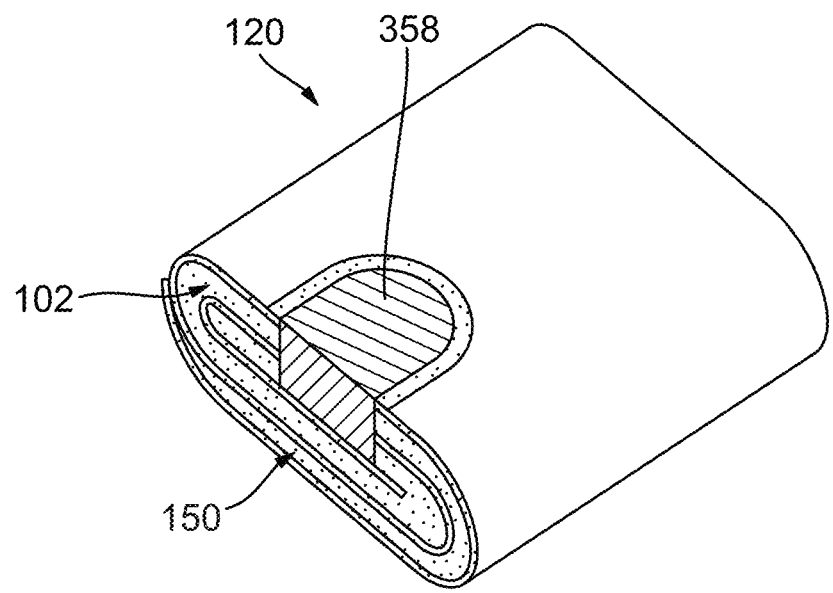
FIG. 3A illustrates a top perspective view of another embodiment of the vaporizer cartridge including another embodiment of the heating element including a perforated electrically conductive material.
Figure 3B:
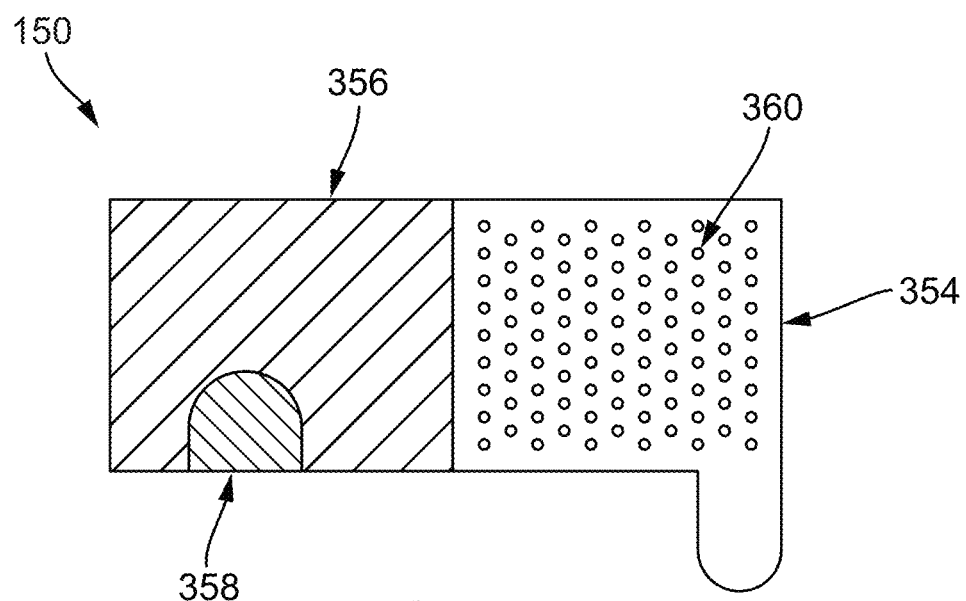
FIG. 3B illustrates a top view of the heating element of FIG. 3A including an electrically resistive area having a plurality of perforations.

FIGS. 3A-3B illustrate another embodiment of the vaporizer cartridge 120 including another embodiment of the heating element 150 (shown in FIG. 3B). As shown in FIG. 3B, the heating element 150 includes an electrically resistive element 354 that is at least partly formed out of an electrically conductive material. In some embodiments, the electrically conductive material of the electrically resistive element 354 can include a foil material that is treated to increase its electrical resistance, such as along one or more parts or areas of the foil material. For example, the electrically resistive element 354 can include one or more parts having perforations and/or varying dimensions (e.g., varying thickness) that effect the electrical resistance of such parts of the electrically resistive element 354. In some embodiments, a first part of the electrically resistive element 354 can include a non-conductive material backing 356 (e.g., paper material) extending along a side of the electrically resistive element 354. The electrically resistive element 354 can also include a second part that may not include the non-conductive material backing 356. In addition, the second part of the electrically resistive element 354 can include a plurality of perforations 360, which can create one or more electrical resistance along an otherwise more electrically conductive material of the second part. The perforations 360 can have any number of a variety of shapes and sizes and be arranged in one or more of a variety of configurations. Furthermore, the electrically resistive second part can include an electrically conductive material that includes more than one area that each includes different densities of perforations 360 or other physical modifications, thereby creating different areas of electrical resistance. Such different areas of electrical resistance can affect the temperature reached along each area when the electrically resistive element 354 becomes heated (e.g., an electrical current is allowed to travel along the electrically resistive element 354). As shown in FIGS. 3A and 3B, a part of the heating element 150 can include a contact part 358 of the heating element 150 that can allow a user a safe surface to contact during and/or after use and therefore may benefit from not becoming heated. For example, the contact part 358 can include material that is not electrically or thermally conductive.

As shown in FIG. 3A, the heating element 150 can be wrapped around a vaporizable material 102, such as a non-liquid vaporizable material 102 (e.g., one or more sheets of tobacco). In such a configuration, the heating element 150 can both define a chamber configured to contain the vaporizable material 102, as well as heat and contain the vaporizable material 102 within the chamber. Such a configuration can increase the contact between the vaporizable material 102 and the heating element 150, thereby allowing the heating element 150 to efficiently heat up the vaporizable material 102. Furthermore, a thermal gradient across the vaporizable material 102 can be reduced (e.g., less than or equal to the width of a tobacco sheet) in such a configuration. This can allow the heating element 150 to heat to a temperature within the desired predefined temperature range while also efficiently vaporizing an acceptable fraction (ideally but not necessarily all or substantially all) of the vaporizable material 102 contained in the chamber.

Figure 4D:
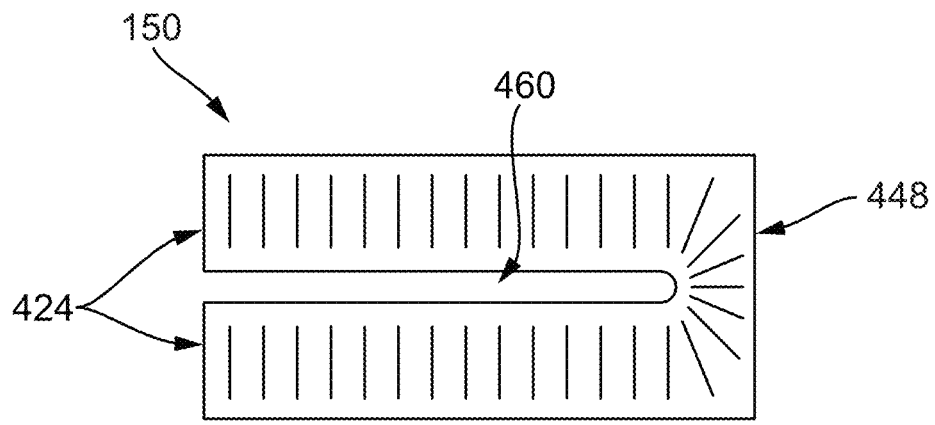
FIG. 4D illustrates a top view of another embodiment of the heating element of FIG. 4B including a slit extending along a length of the heating element and intersecting an end of the heating element.

FIGS. 4A-4E illustrate another embodiment of the vaporizer cartridge 120 including an embodiment of the heating element 150. As shown in FIG. 4A, the vaporizer cartridge 120 can include a housing 462 having an opening 464 for receiving an embodiment of the heating element 150 and vaporizable material 102. The housing 462 can include a non-electrically conductive material and the heating element 150 can include an electrically conductive sheet 448, which can also be thermally conductive. As shown in FIG. 4B, the electrically conductive sheet 448 can include a plurality of perforations 460 (e.g., slits, holes, etc.) that can affect the resistance along the thermally conductive sheet 448. In addition, the thermally conductive sheet 448 can include at least one side extension forming cartridge contacts 424 (e.g., such as cartridge contacts 124a, 124b of FIG. 1) that can mate with and extend through an opening 428 along the housing 462, as shown in FIG. 4A. Such a side extension forming cartridge contacts 424 can be positioned to mate with a receptacle contact (e.g., receptacle contacts 125a, 125b in FIG. 1) of an embodiment of the vaporizer body 110 thereby allowing current to flow from the power supply 112 of the vaporizer body 110 to the heating element 150. This can allow the heating element 150 to heat to a temperature within the desired temperature range.

Figure 4E:
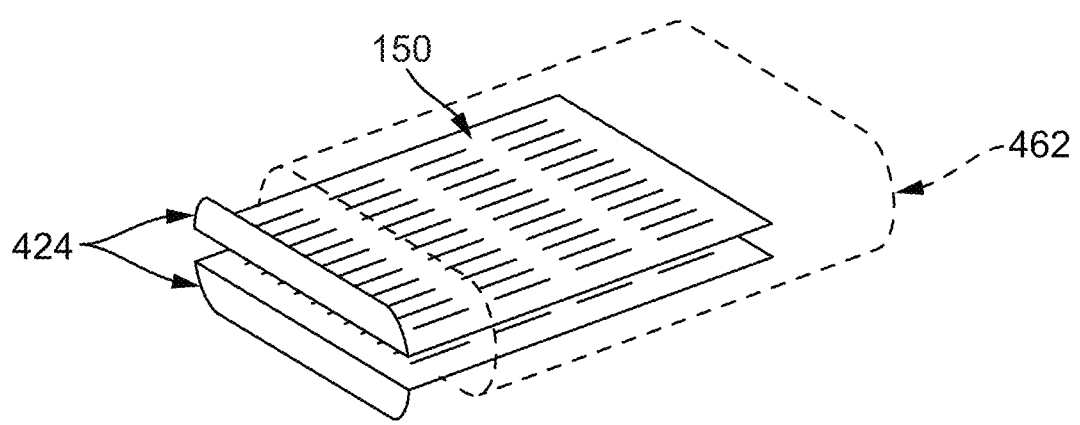
FIG. 4E illustrates a perspective view of the heating element of FIG. 4D showing the heating element folded long at least the slit.

As shown in FIG. 4C, the heating element 150 may include at least one flat surface in which the vaporizable material 102 can mate directly against, thereby providing efficient heat transfer (e.g., conductive heat transfer) between the heating element 150 and the vaporizable material 102 (e.g., one or more sheets of tobacco). Furthermore, a thermal gradient across the vaporizable material 102 can be minimal (e.g., less than or equal to the width of a tobacco sheet) in such a configuration. This can allow the heating element 150 and vaporizable material 102 to heat to a temperature within the desired temperature range while also efficiently vaporizing all or substantially all of the vaporizable material 102. Other variations and/or features of the heating element 150 are within the scope of this disclosure, such as folding the heating element 150 and/or including cartridge contacts 424 extending from an end of the heating element 150 (as shown in FIG. 4E).

In some embodiments, the electrically conductive sheet 448 can include etching along one or both sides of the electrically conductive sheet 448. The electrically conductive sheet 448 can include one or more cutouts or perforations 460, such as along a longitudinal axis and extending through an end of the electrically conductive sheet 448, as shown in FIG. 4D. Alternatively, as shown in FIG. 4B, the electrically conductive sheet 404 can include a cutout or perforation 460 that does not extend into or through an end of the electrically conductive sheet 448, as well as a plurality of perforations 460 along the electrically conductive sheet 448. The electrically conductive sheet 448 can be long and thin to allow for electrical resistance that is sufficient to achieve fast and effective heating of the heating element 150 (e.g., the electrically conductive sheet 448) within the desired heating range.

Figure 4F:
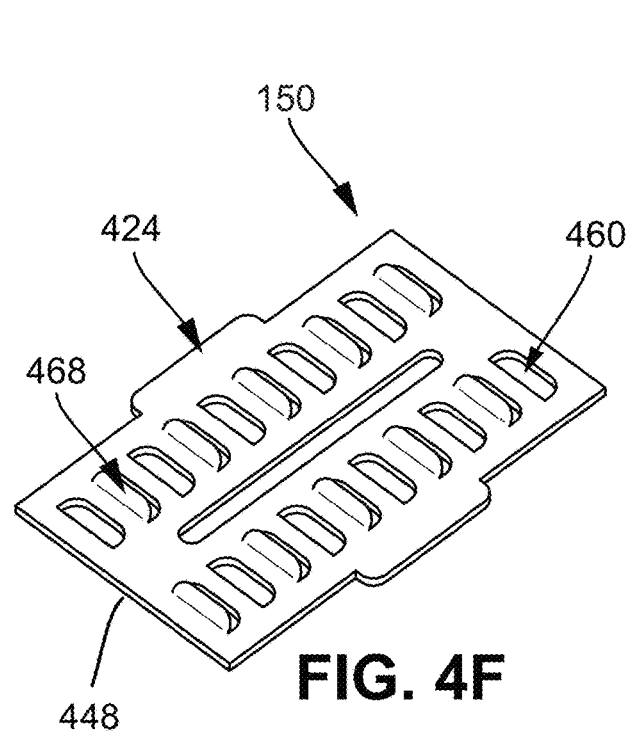
FIG. 4F illustrates a perspective view of another embodiment of the heating element of FIG. 4B including at least one extension extending from a top side and/or a bottom side of the sheet of the heating element.
Figure 4G:
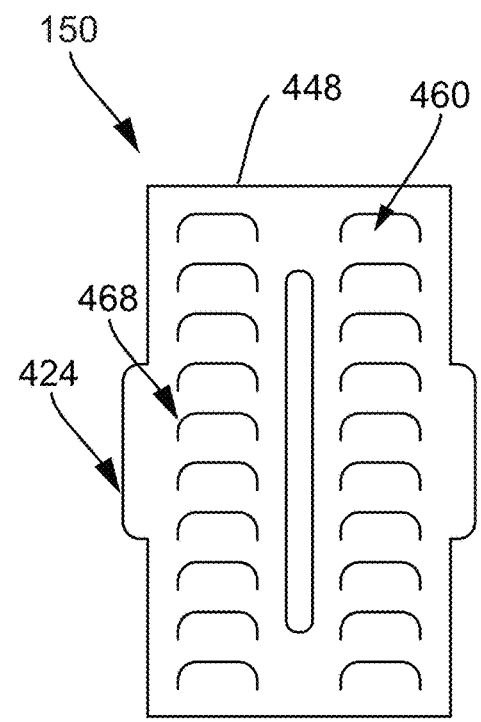
FIG. 4G illustrates a top view of the heating element of FIG. 4F.
Figure 4H:
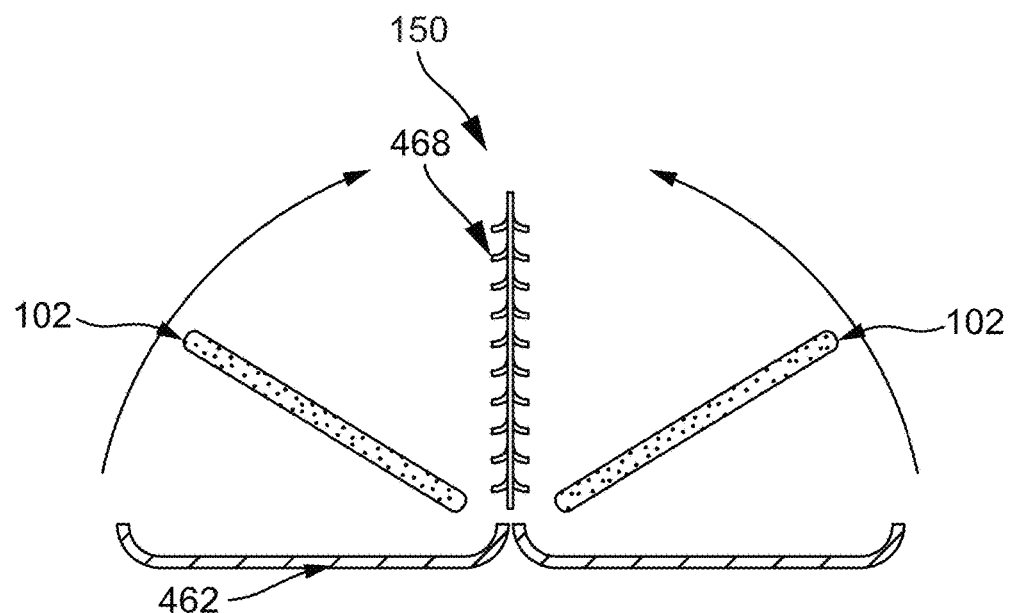
FIG. 4H illustrates an embodiment of a vaporizer cartridge housing for securing the heating element of FIG. 4F and non-liquid vaporizable material therewithin.

In some embodiments of the heating element 150, as shown in FIGS. 4F and 4G, one or more extensions 468 can extend from a top and/or bottom surface of the electrically conductive sheet 448, which can result in the heating element 150 forming a three-dimensional shape. Such extensions 468 can be formed when forming the perforations 460 (e.g., via stamping the electrically conductive sheet 448). The extensions 468 can provide additional surface area that can integrate with the vaporizable material 102, such as when the extensions 468 extend into the vaporizable material 102, which can assist with achieving three-dimensional heating of the vaporizable material. As shown in FIG. 4H, some embodiments of the housing 462 can include a clamshell configuration such that the heating element 150 (e.g., any of the heating element embodiments shown in FIGS. 4A-4G) can be captured in the housing 462 along with at least two sheets of vaporizable material 102 (e.g., tobacco sheets) positioned on opposing sides of the heating element 150. This can provide a compact configuration with efficient assembly.

Figure 5A:
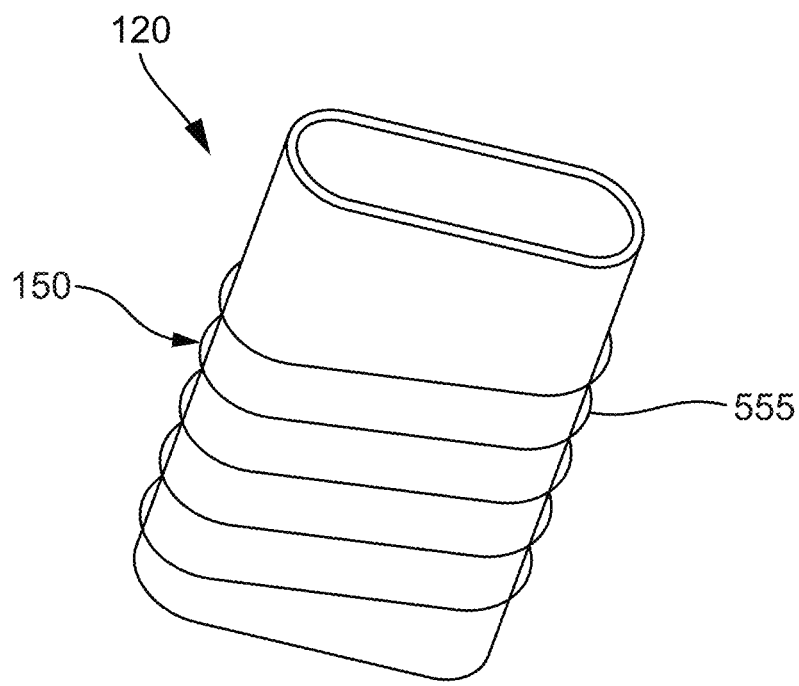
FIG. 5A illustrates a top perspective view of another embodiment of the vaporizer cartridge including another embodiment of a heating element including an induction coil and ferrous material.
Figure 5B:
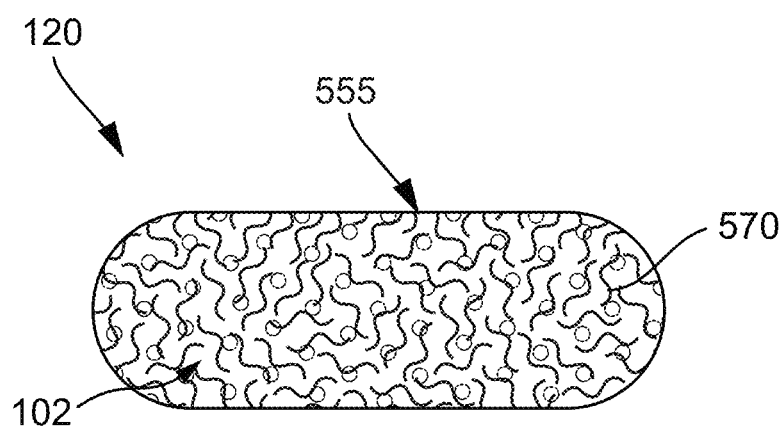
FIG. 5B illustrates an end view of the vaporizer cartridge of FIG. 5A showing the ferrous material interspersed in non-liquid vaporizable material.

FIGS. 5A-5B illustrate another embodiment of the vaporizer cartridge 120 including another embodiment of the heating element 150 that includes an induction coil 555 and ferrous material 570. For example, the induction coil 555 can be wrapped around the vaporizable material 102, such as directly around a sheet of vaporizable material 102. In addition, the ferrous material 570 may be mixed with the vaporizable material 102 and may be heated as a result of interaction of the ferrous material 570 with electrical and/or magnetic fields created by current passing through the inductive coil 555. The ferrous material 570 inter-mixed with the vaporizable material 102 can allow a more even distribution of heat along and/or within the vaporizable material 102, thereby reducing a thermal gradient along the vaporizable material 102. This can allow heating of the vaporizable material 102 to a temperature within the desired temperature range and thereby effectively vaporize the vaporizable material 102.

Figure 6:
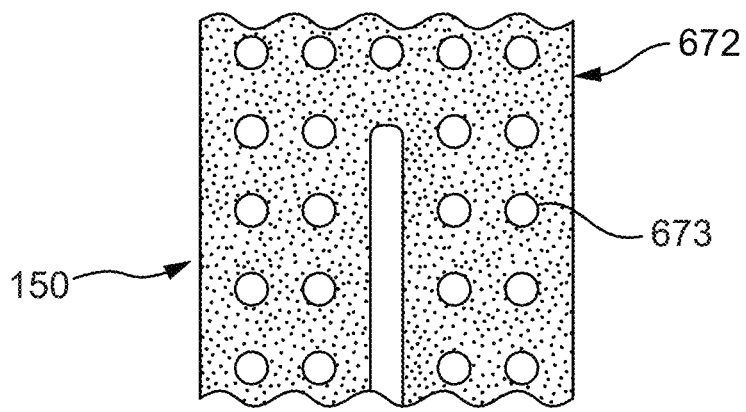
FIG. 6 illustrates a partial cross-section view of another embodiment of a heating element including an electrically resistive foam structure.

FIG. 6 illustrates a side cross-section view of another embodiment of the heating element 150 including a thermally conductive foam structure 672. The thermally conductive foam structure 672 can include electrically resistive properties, such as materials and/or features along the thermally conductive foam structure 672 that cause an increase in resistance. In some embodiments, the thermally conductive foam structure 672 can include a plurality of chambers or cells 673, such as shown in FIG. 6, which can each contain vaporizable material. For example, the vaporizable material 102 may be placed into the cells 673 of the conductive foam structure 672 (e.g., within at least one cell of an open cell thermally conductive foam structure 672). Current can be run through the thermally conductive foam structure 672 to thereby evenly heat the vaporizable material 102 within the cells 673 as a result of resistive heating of the thermally conductive foam structure 672, such as at a temperature within the desired temperature range. In some embodiments, the thermally conductive foam structure 672 can be formed out of a reticulated carbon foam, an aluminum foam, etc.

Figure 7A:
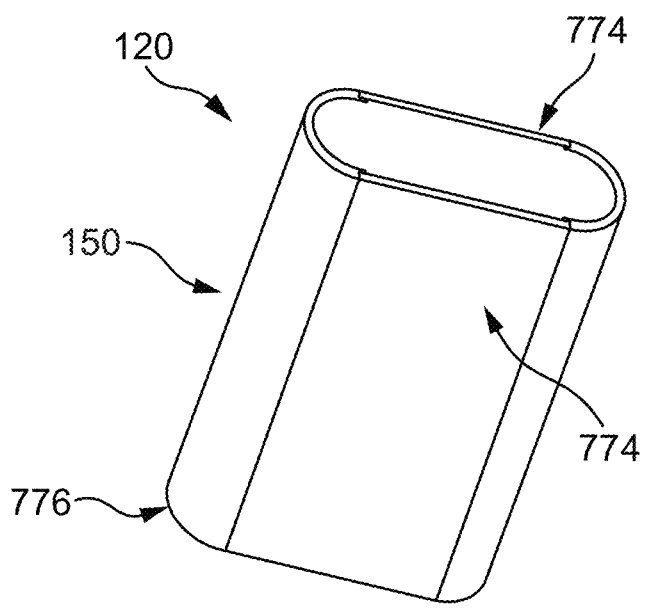
FIG. 7A illustrates a top perspective view of another embodiment of a vaporizer cartridge including another embodiment of a heating element having electrically conductive plates separated by an insulating material and an at least partially electrically conductive mixture.
Figure 7B:
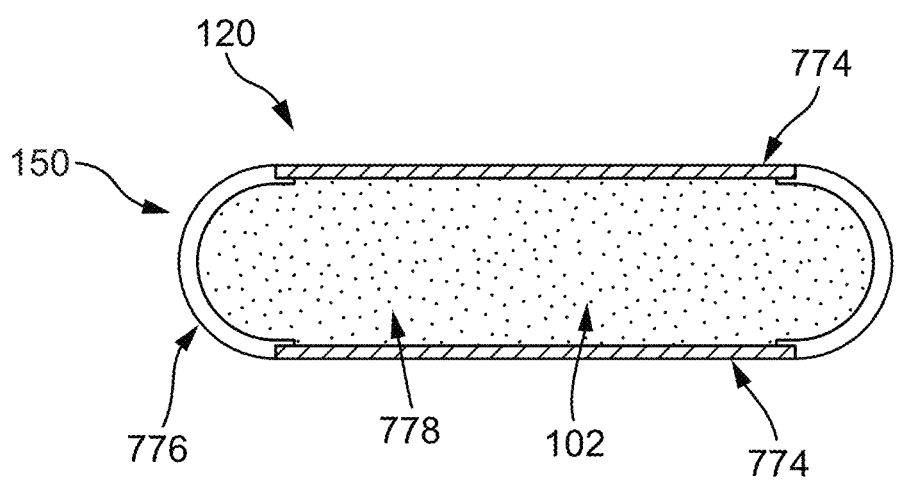
FIG. 7B illustrates an end view of the vaporizer cartridge of FIG. 7A.

FIGS. 7A and 7B illustrate another embodiment of the vaporizer cartridge 120 including another embodiment of the heating element 150 including conductive plates 774 separated by at least one non-conductive insulating material 776. As shown in FIGS. 7A and 7B, the conductive plates 774 and insulating material 776 can form an elongated rectangular or oval shape that defines a chamber configured to contain vaporizable material 102. The heating element 150 can further include an at least partially electrically conductive mixture 778 that can be included in the vaporizable material 102, thereby creating a bulk resistor out of the vaporizable material 102. The conductive plates 774 may function to conduct heat and/or electricity (e.g., delivered from the power source 112 of the vaporizer body 110 of FIG. 1) and act as cartridge contacts (e.g., cartridge contacts 124a, 124b of FIG. 1) that mate with receptacle contacts (e.g., receptacle contacts 125a, 125b of FIG. 1) of the vaporizer body 110 to which the vaporizer cartridge 120 is coupled to.

Any of the heating elements 150 described herein can include at least one cartridge contact (e.g., cartridge contacts 124a, 124b of FIG. 1) or can be in electrical communication with at least one cartridge contact (e.g., cartridge contacts 124a, 124b of FIG. 1) for allowing electrical energy to be transmitted from the power source 112 of the vaporizer body 110 to the heating element of the vaporizer cartridge 120. This can allow the heating element 150 to increase in temperature and vaporize the vaporizable material 120 within the desired temperature range.

In some embodiments, a reverse flow heat exchanger may be implemented into a vaporizer cartridge 120 and/or vaporizer device 100 for assisting with achieving heating the vaporizable material 102 within the desired temperature range. For example, an embodiment of the vaporizer cartridge 120 including a reverse flow heat exchanger can implement conductive and convective heating.

Figure 8A:
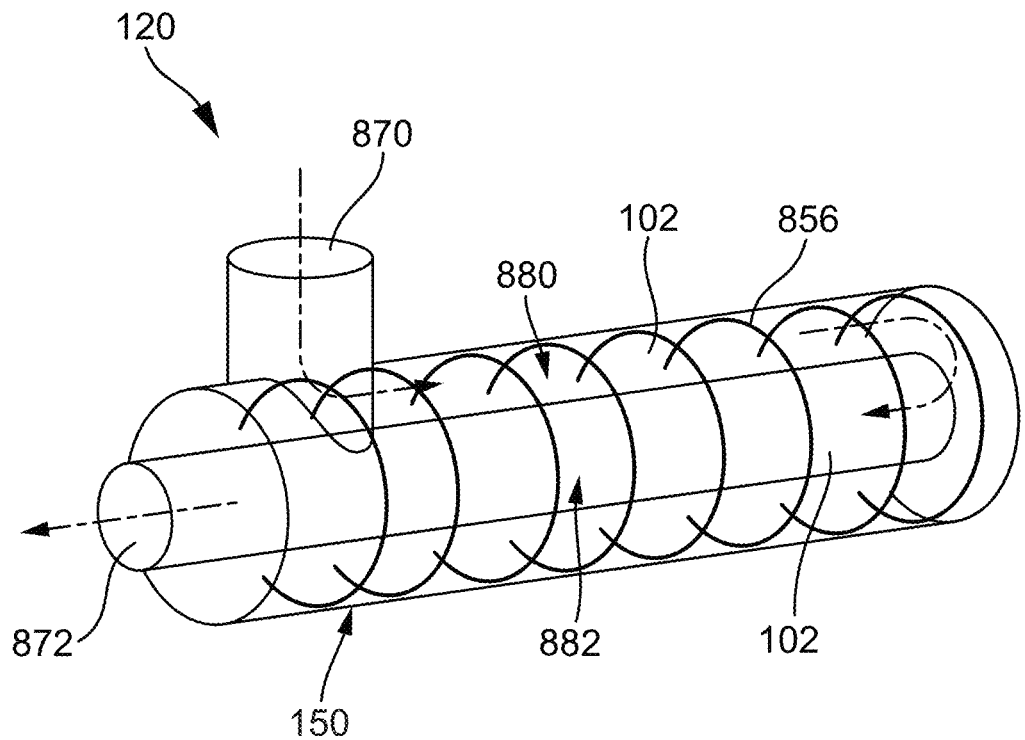
FIG. 8A illustrates a perspective view of another embodiment of the vaporizer cartridge.
Figure 8B:
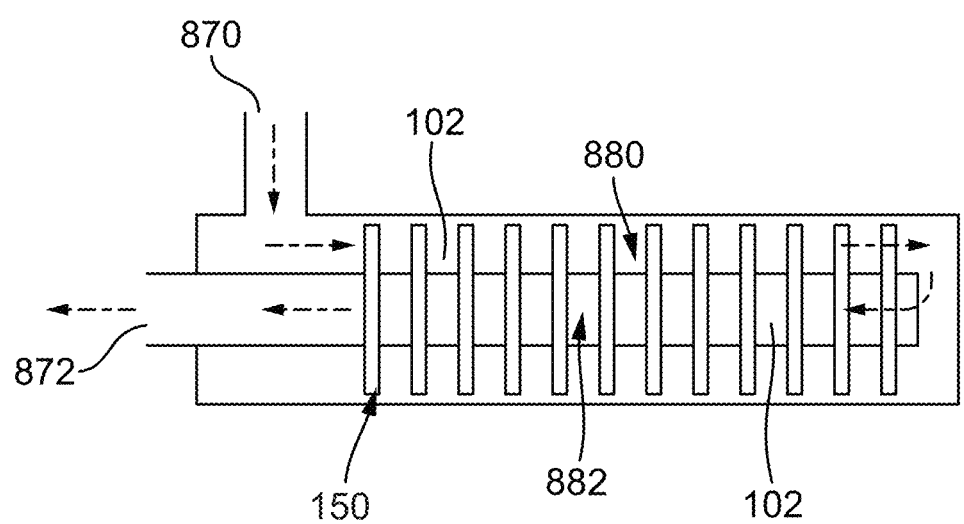
FIG. 8B illustrates a cross-sectional schematic view of the vaporizer cartridge of FIG. 8A.

FIGS. 8A-8B illustrate another embodiment of the vaporizer cartridge 120 including another embodiment of the heating element 150. As shown in FIG. 8A, the heating element 150 of the vaporizer cartridge 120 can include a thermally conductive element 856 that at least partly encircles an outer circumference of vaporizable material 102. The thermally conductive element 856 can, for example, be formed out of one or more of a variety of thermally conductive materials and configured to reach a temperature that heats adjacent vaporizable material 102 within the desired temperature range for efficiently and effectively vaporizing the vaporizable material 102. For example, the thermally conductive element 856 can include a wire and/or thin sheet of thermally and/or electrically conductive material.

As shown in FIGS. 8A and 8B, the vaporizer cartridge 120 can have an elongated cylindrical shape and include a first passageway 880 extending along an outer circumferential area of the vaporizer cartridge 120, such as adjacent the thermally conductive element 856. Additionally, the vaporizer cartridge 120 can include a second passageway 882 extending along a longitudinal axis of the first passageway 880. The first passageway 880 can be in direct communication with an inlet 870 and the second passageway 882 can be in direct fluid communication with an outlet 872. For example, the outlet 872 can allow inhalable aerosol to pass therethrough to allow for inhalation by a user of the vaporizer device 100. As shown in FIGS. 8A and 8B, the first passageway 880 and second passageway 882 can be in communication with each other, such as to allow airflow that has passed along the first passageway 880 to flow into and along the second passageway 882. For example, the first and second passageways 880 and 882 can be at least partly defined by material that is at least partly not air permeable to assist with directing airflow from the inlet 870 to pass along the first passageway 880 and then along the second passageway 882 before passing through the outlet 872. In some embodiments, the first passageway 880 and/or second passageway 882 can be at least partly filled with vaporizable material 102.

For example, airflow can flow through the inlet 870 as a result of a user inhaling on the vaporizer device 100. Additionally, the thermally conductive element 856 can be activated to begin heating the vaporizable material 102 before and/or during introduction of airflow through the inlet. As such, the vaporizable material 102 positioned along the first passageway 880 can be heated by the heating element 150 (e.g., via conductive heating). The airflow can travel along the first passageway 880 and become heated, such as from the thermally conductive element 856 and/or by the heated vaporizable material 102. As such, the airflow can be heated as it enters and flows along the second passageway 882, which can also contain vaporizable material 102. As such, the heated airflow can increase the temperature of the vaporizable material 102 (e.g., via convection) positioned along the second passageway 882. This can assist with increasing the speed at which the vaporizable material 102 contained in the second passageway 882 heats to a temperature within the desired temperature range, as well as reducing power consumption and temperature gradients throughout the vaporizable material 102.

At least some of the advantages of the vaporizer cartridges 102 and heating elements 150 described herein include a reduction in peak temperatures along the vaporizable material 102 that are greater than the desired temperature range. As such, this may result in at least a reduction in unwanted byproducts being created while vaporizing the vaporizable material 102. Additionally, at least some of the vaporizer cartridges 102 and heating elements 150 disclosed herein do not include or require direct contact between the vaporizable material 102 and the vaporizer body 110, which can result in reduced maintenance (e.g., cleaning, etc.) of the vaporizer body 110 at least compared to vaporizer devices configured to have vaporizable material directly contact the reusable portion of the vaporizer device.

Any one or more parts of the heating element 150 and/or airflow passageways described herein can be included in the vaporizer cartridge 120 and/or in the vaporizer body 110. Furthermore, various embodiments of one or more heating elements 150 can be included in the vaporizer device 100, such as in the vaporizer cartridge 120 and/or in the vaporizer body 110. For example, the heating element 150 can be included in the vaporizer body 110 of the vaporizer device 100. Furthermore, although some embodiments of the heating element 150 described herein are described as being incorporated with the vaporizer cartridge 120, the heating element 150 can be incorporated in the vaporizer body 110. Disclosed herein are various embodiments of heating elements 150 for efficiently and effectively heating, including vaporizing, various vaporizable material 102.

Figure 9A:
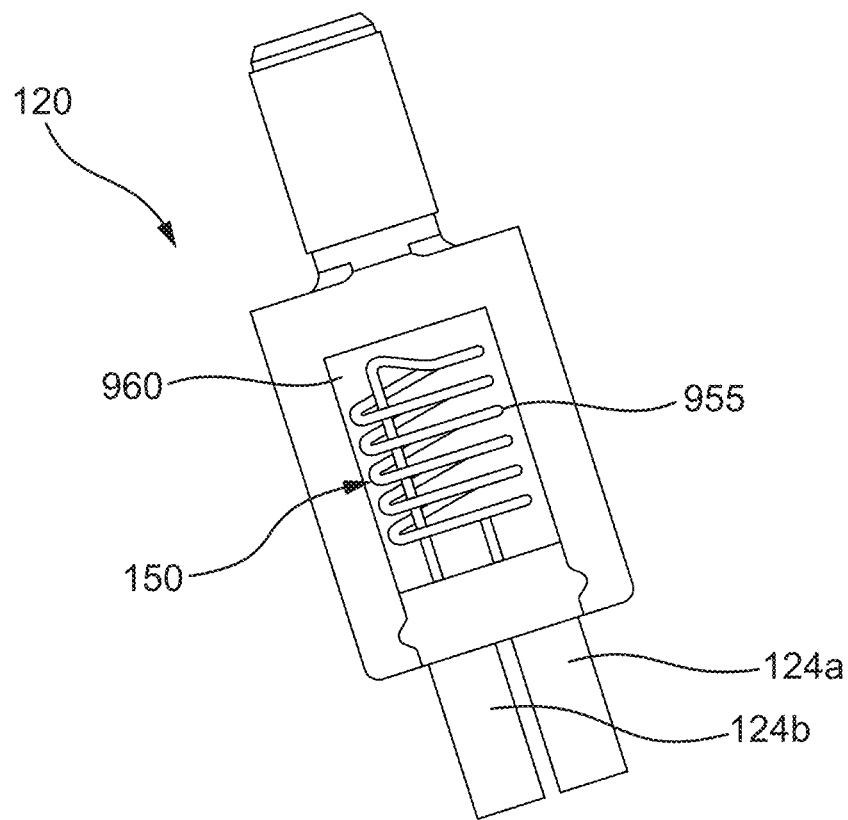
FIG. 9A illustrates a top perspective view of another embodiment of the vaporizer cartridge including another embodiment of a heating element including a single spiral conductive component.
Figure 9B:
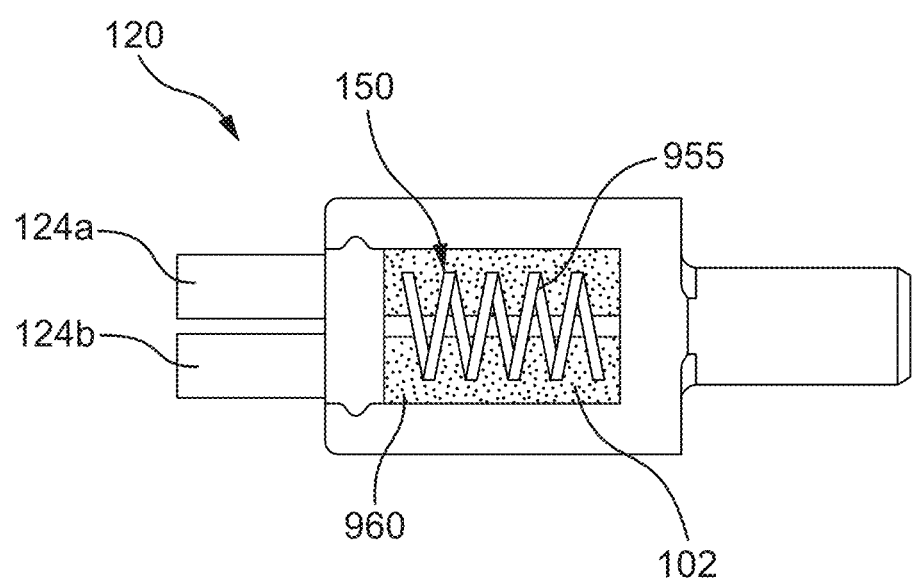
FIG. 9B illustrates a top view of the vaporizer cartridge of FIG. 9A showing a vaporizable material surrounding the single spiral conductive component.

FIGS. 9A-9B illustrate another embodiment of the heating element 150 including a single spiral conductive element 955 that can be configured to extend along a length of a chamber 960 of an embodiment of the vaporizer cartridge 120. As shown in FIGS. 9A and 9B, the chamber 960 can include a depressed rectangular block into the housing 162 of the vaporizer cartridge 120, however, the chamber 960 can include any number of shapes and/or sizes for containing vaporizable material 102 and allowing the single spiral conductive element 955 to be positioned therein.

In some embodiments, the single spiral conductive element 955 can include an electrically conductive and/or thermally conductive wire that is formed into a desired shape for heating vaporizable material 102, such as the single spiral shape shown in FIGS. 9A and 9B. The heating element 150 can include a pair of cartridge contacts 124a, 124b that are coupled to the single spiral conductive element 955. For example, each of the cartridge contacts 124a, 124b can be coupled to opposing ends of the single spiral conductive element 955 and configured to couple to the receptacle contacts 125a, 25b of the vaporizer body 110 for allowing power from the power source 112 to travel to the heating element 150. For example, the single spiral conductive element 955 can be made out of a material that is electrically conductive with resistive properties that causes heating of the single spiral conductive element 955 to a temperature within the desired temperature range as current is delivered therealong.

The three-dimensional helical shape of the single spiral conductive element 955 can allow the heating element 150 to deliver three-dimensional heating, which can include providing heat in a variety of directions (including all directions). Such three-dimensional heating can distribute heat to the vaporizable material 102 more efficiently, evenly, and effectively. As shown in FIG. 9B, the chamber 960 can be filled or partially filled with non-liquid vaporizable material 102 thereby placing vaporizable material 102 around and within the single spiral conductive element 955. Such a configuration of the heating element 150 can also allow for greater heating surface area contacting the vaporizable material 102 while achieving a compact and light-weight embodiment of the vaporizer cartridge 102. Furthermore, at least due to the three-dimensional configuration of the heating element 150, the distance between the heating element 150 and all of the vaporizable material 102 in the chamber 960 can be, at least on average, less than some heating elements having a generally two-dimensional shape. Various other three-dimensional heating element shapes for achieving three-dimensional heating, such as within a chamber containing the vaporizable material 102, are within the scope of this disclosure, some of which are described in greater detail below.

Figure 10:
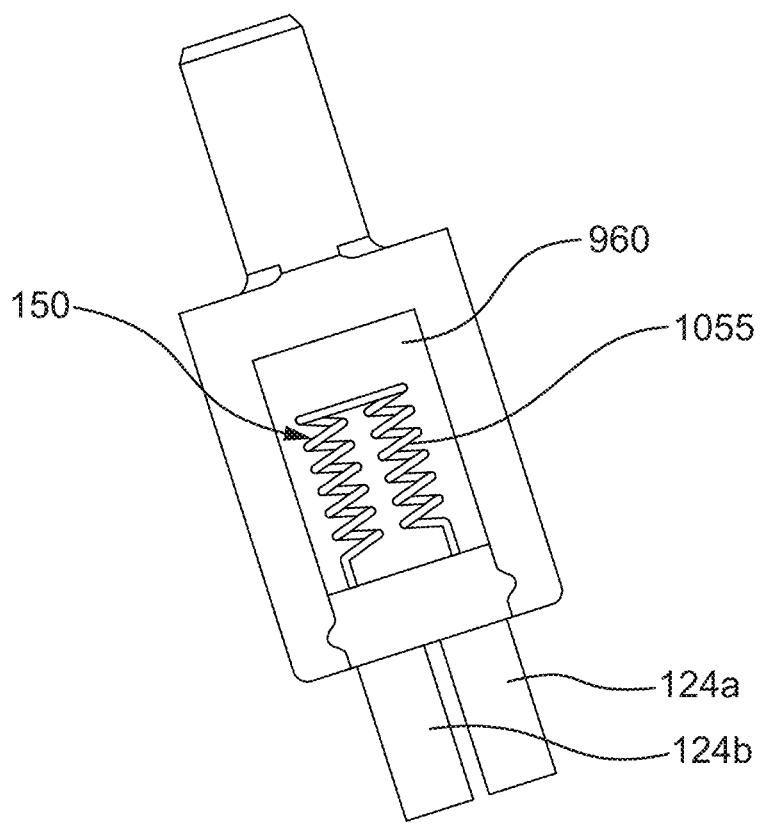
FIG. 10 illustrates a top perspective view of another embodiment of the vaporizer cartridge including a pair of spiral conductive components.

FIG. 10 illustrates another embodiment of the heating element 150 including a pair of spiral conductive elements 1055. The three-dimensional pair of spiral conductive elements 1055 can achieve three-dimensional heating with the chamber 960, as well as provide additional heating surface area contacting the vaporizable material 102 contained within the chamber 960 of the vaporizer cartridge 102, while also achieving a compact and light-weight embodiment of the vaporizer cartridge 120. Furthermore, the pair of spiral conductive elements 1055 can decrease the distance between the heating element 150 and all of the vaporizable material in the chamber 960, at least on average, compared to the single spiral conductive component. The heating element 150 can include a pair of cartridge contacts 124a, 124b that are coupled to the pair of spiral conductive elements 1055. For example, each of the cartridge contacts 124a, 124b can be coupled to opposing ends of the pair of spiral conductive elements 1055 and configured to couple to the receptacle contacts 125a, 125b of the vaporizer body 110 for allowing power from the power source 112 to travel to the heating element 150. For example, the pair of spiral conductive elements 1055 can be made out of a material that is electrically conductive with resistive properties that causes heating of the pair of spiral conductive elements 1055 to a temperature within the desired temperature range as current is delivered therealong.

Figure 11A:
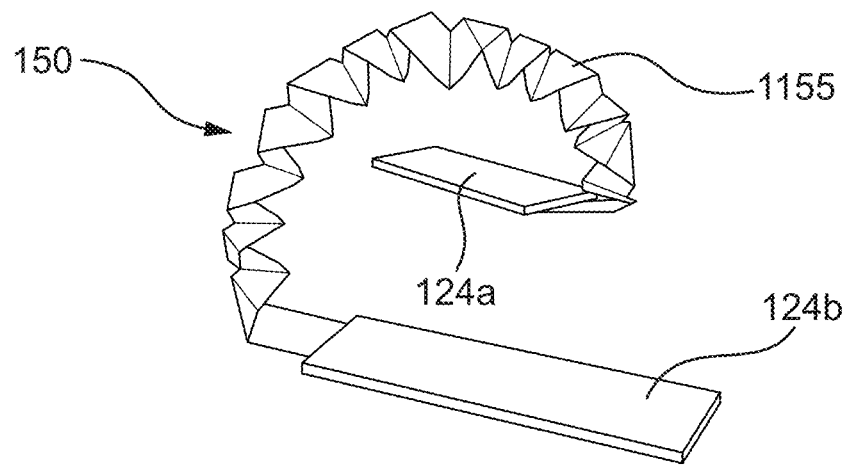
FIG. 11A illustrates a top perspective view of another embodiment of the heating element including a multi-folded conductive component.
Figure 11B:
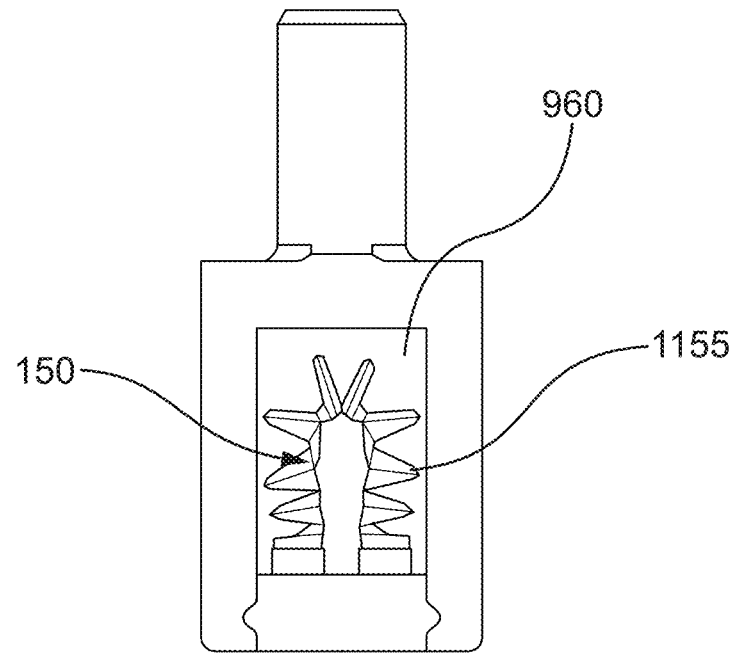
FIG. 11B illustrates a top view of the heating element of FIG. 11A within a chamber of an embodiment of the vaporizer cartridge.

FIGS. 11A-11B illustrate another embodiment of the heating element 150 including a multi-folded conductive component 1155, which can be made out of a thin material that is thermally and electrically conductive. Such thin thermally and electrically conductive material can be bent in various directions along a length of the thin thermally and electrically conductive material to form the three-dimensional multi-folded conductive component 1155, as shown in FIGS. 11A and 11B. As shown in FIG. 11B, the multi-folded conductive component 1155 can be positioned within the chamber 960 of an embodiment of the vaporizer cartridge 120 and a non-liquid vaporizable material 102 can be added to the chamber 960 thereby covering the plurality of sides or faces of the multi-folded conductive component 1155. The plurality of folds along the multi-folded conductive component 1155 can achieve three-dimensional heating and allow for an increased amount of heating surface area in a plurality of directions within the chamber 960, which can result in an even and efficient distribution of heat along the vaporizable material 102 contained in the chamber 960.

Such even and efficient heating of the vaporizable material 102 can provide a number of benefits, such as allowing the vaporizable material 102 to be heated to a desired temperature (such as for vaporizing the vaporizable material 102) more quickly compared to some two-dimensional heaters. This can allow lower temperatures to be required to achieve desired results (such as vaporization of the vaporizable material 102), as well as efficient and effective heating of at least a majority of the vaporizable material 102 contained in the chamber 960. As such, start-and-stop puffing can be effectively achieved with such three-dimensional heating elements 150 and the vaporizable material 102 can be effectively used. Reduced power consumption can also be a result of such efficient heating. Other benefits and uses of the three-dimensional heating elements 150 are contemplated and within the scope of this disclosure.

Figure 12:
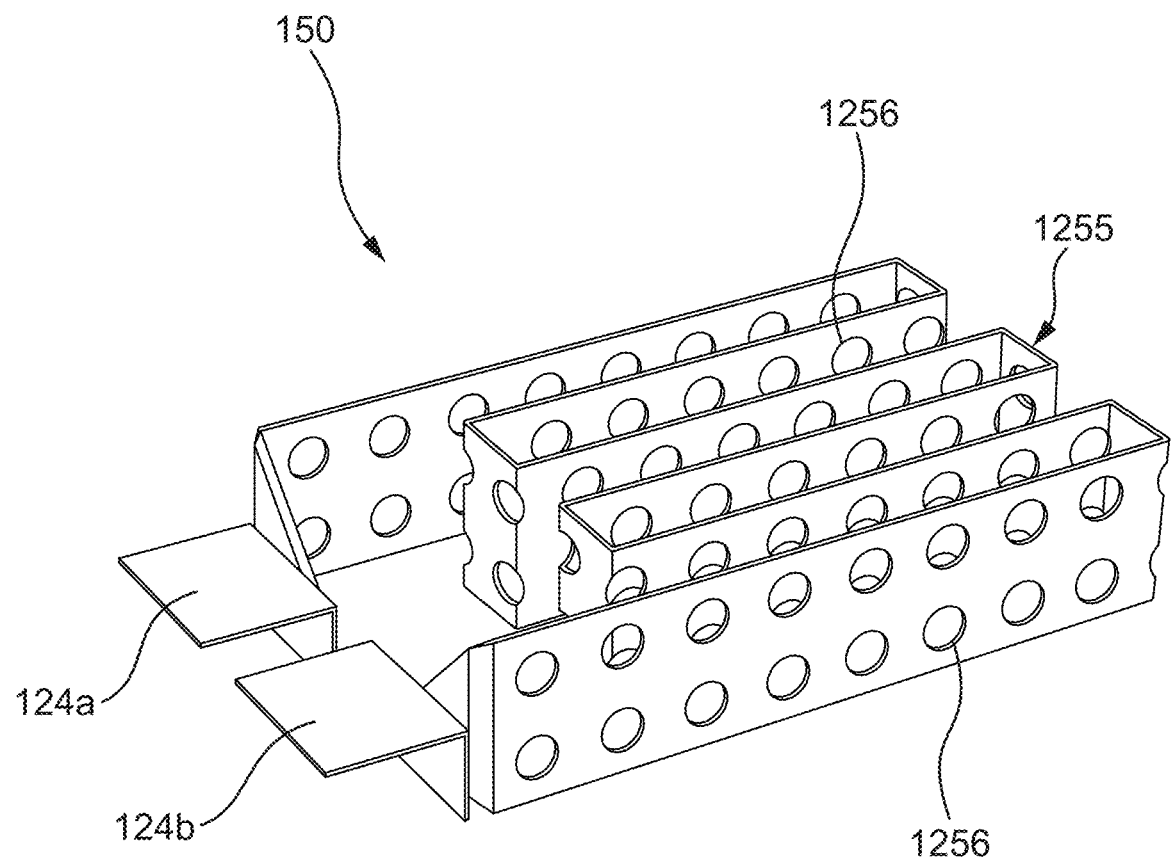
FIG. 12 illustrates a side perspective view of another embodiment of the heating element including a multi-folded conductive component including a plurality of holes.

FIG. 12 illustrates another embodiment of the heating element 150 including a multi-folded conductive component 1255. As shown in FIG. 12, the multi-folded conductive component 1255 can include a single thin thermally and electrically conductive material. Such thin material can be bent to form a three-dimensional formation including a plurality of rectangular sections forming rectangular spaces therebetween. The heating element 150 can include electrical contacts (e.g., cartridge contacts 124a and 124b) at opposing ends of the multi-folded conductive component 1255, such as for coupling to the power source 112 of the vaporizer body 110. As shown in FIG. 12, the multi-folded conductive component 1255 can include a plurality of holes 1256 along the thin thermally and electrically conductive material, which can affect the resistance therealong. As such, the multi-folded conductive component 1255 can become heated as a result of current being passed along the multi-folded conductive component 1255. The multi-folded conductive component 1255 can be positioned in a chamber of a vaporizable cartridge 120 and placed in contact with vaporizable material 102. For example, the vaporizable material 102 can be placed along and between the multiple folds or lengths of the multi-folded conductive component 1255. The multi-folded conductive component 1255 can include greater surface area, such as compared to a flat and unfolded heating element 150 with similar dimensions. As such, the multi-folded conductive component 1255 of the heating element 150 can achieve three-dimensional heating, as well as efficiently and effectively heat (including vaporize) adjacent vaporizable material 102.

Figure 13A:
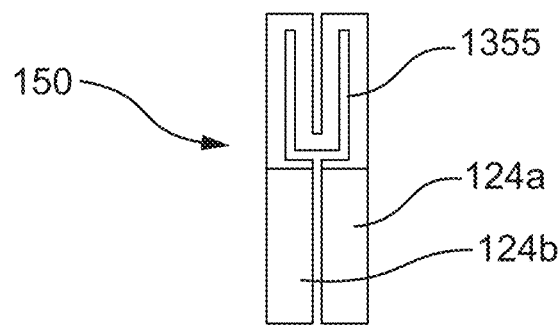
FIG. 13A illustrates a top view of another embodiment of the heating element including a flat non-linear conductive component.
Figure 13B:
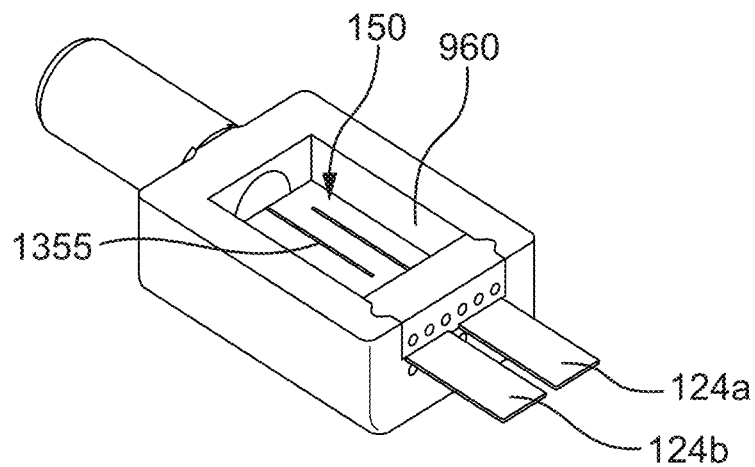
FIG. 13B illustrates a top perspective view of the heating element of FIG. 12A within a chamber of an embodiment of the vaporizer cartridge.
Figure 13C:
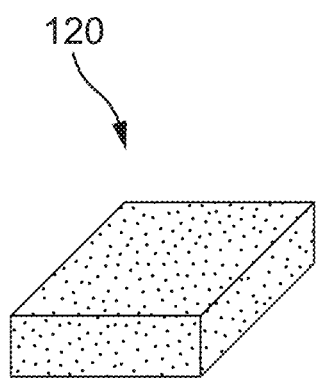
FIG. 13C illustrates a top perspective view of a non-liquid vaporizable material formed in a shape.
Figure 13D:
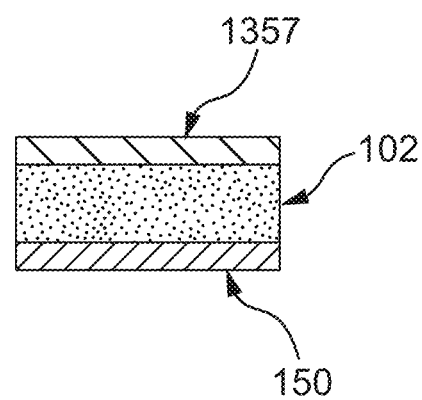
FIG. 13D illustrates a side cross-section view of the heating element of FIG. 13A and a saturated pad positioned on opposing sides of the formed non-liquid vaporizable material of FIG. 13C.

FIGS. 13A-13B illustrates another embodiment of the heating element 150 including a flat non-linear conductive component 1355 including cartridge contacts 124a and 124b at opposing ends of the flat non-linear conductive component 1355. As shown in FIG. 13A, the flat non-linear conductive component 1355 can extend in more than one direction along a plane and effectively provide a surface of heating, such as within the chamber 960 of an embodiment of a vaporizer cartridge 120, as shown in FIG. 13B. The flat configuration of the flat non-linear conductive component 1355 can allow vaporizable material 102 formed into a complimentary, flat shape to be placed adjacent to, as well as be effectively and efficiently heated by, the flat non-linear conductive component 1355. For example, as shown in FIGS. 13C and 13D, some embodiments of the vaporizable material 102 can include vaporizable material 102 in the form of a thin rectangular shape. Other shapes of the formed vaporizable material 102 are within the scope of this disclosure, such as any shape including at least one flat side configured to mate against the heating element 150, as shown in FIG. 13D. In some embodiments, as shown in FIG. 13D, the vaporizable material 102 can be placed along a first side of the flat non-linear conductive component 1355 and a saturated pad 1357 can be placed on an opposing side of the flat non-linear conductive component 1355. For example, the saturated pad 1357 can include a porous material that is saturated with a liquid that can assist with preventing the vaporizable material 102 from drying out and/or maintaining a desired moisture level. For example, the saturated pad 1357 and/or vaporizable material 102 can be saturated with propylene glycol or vegetable glycerin. Other liquid materials are within the scope of this disclosure.

Figure 14C:
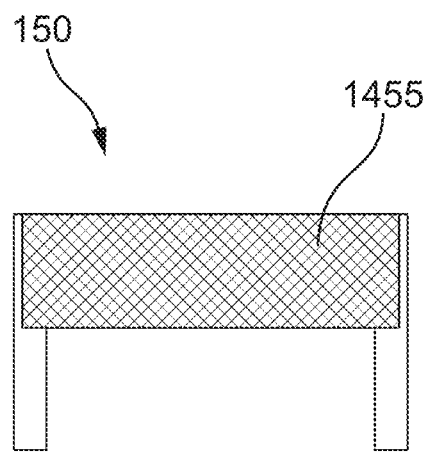
FIG. 14C illustrates the heating element of FIG. 14A with the heating element in a folded configuration with the formed vaporizable material.
Figure 14C:
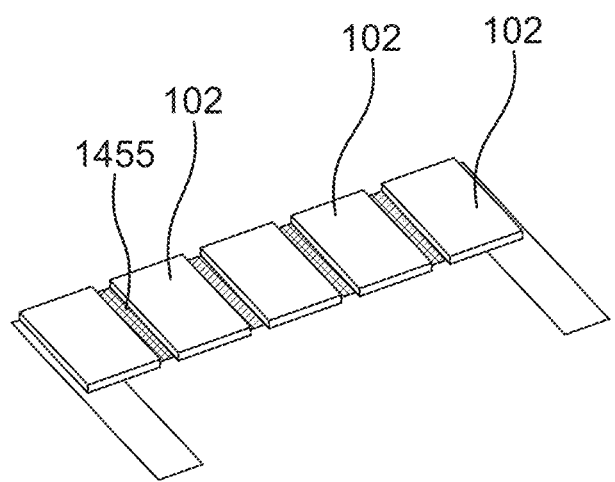
Figure 14C:
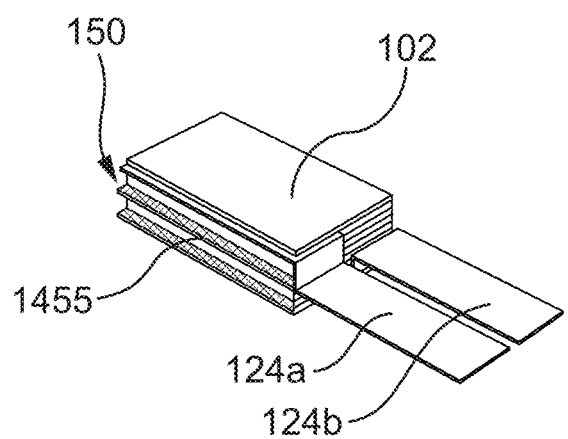

FIGS. 14A-14D illustrate another embodiment of the heating element 150 that can be included in an embodiment of the vaporizer cartridge 120. As shown in FIGS. 14A-14C, the heating element 150 can include a flat conductive sheet 1455 that can be folded along with a plurality of formed vaporizable material 102 (e.g., compressed sheets of tobacco) placed in contact with the flat conductive sheet 1455, as shown in FIGS. 14B and 14C. The flat conductive sheet 1455 can be formed from a thermally conductive and/or electrically conductive material. For example, the formed vaporizable material 102 can include at least one flat side, such as two opposed flat sides, that allow the formed vaporizable material 102 to have sufficient surface area contact with the heating element 150 to achieve efficient and effective heating and vaporization of the vaporizable material 102. For example, in some embodiments the heating element 150 can include a plurality of holes along the flat conductive sheet 1455, thereby affecting the resistance and allowing the flat conductive sheet 1455 to efficiently and effectively reach a temperature within the desired temperature range when a current is delivered to the flat conductive sheet 1455 (e.g., via the cartridge contacts 124a and 124b). As shown in FIGS. 14B and 14C, the heating element 150 can fold to capture five formed elements of vaporizable material 102, however, more or less folds and/or formed elements of vaporizable material 102 can be mated with the heating element 150.

Figure 15A:
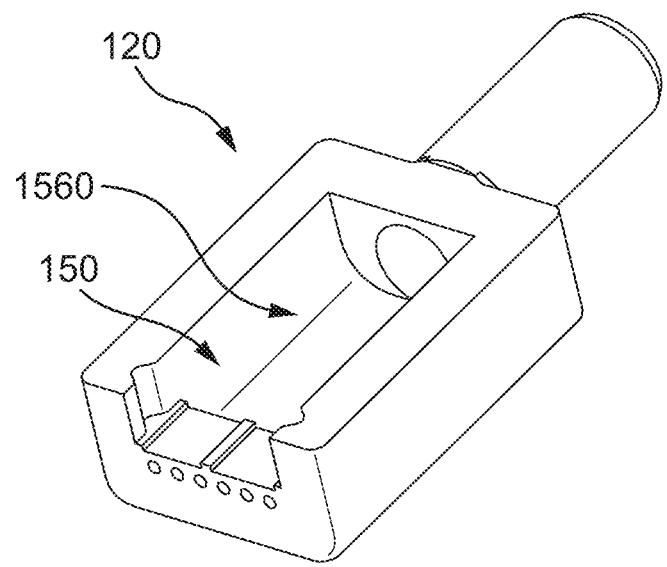
FIG. 15A illustrates a top perspective view of an embodiment of a chamber of a vaporizer cartridge including rounded walls.
Figure 15B:
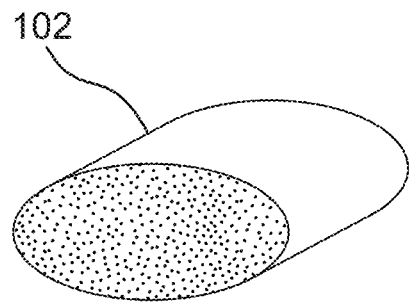
FIG. 15B illustrates an end cross-section view of a rounded or elliptical vaporizable material element that can be positioned in and/or mate with the chamber of FIG. 15A.

FIG. 15A illustrates a top perspective view of an embodiment of the vaporizer cartridge including a chamber 1560 having rounded walls for containing a vaporizable material 102, such as a vaporizable material 102 formed into a rounded configuration, as shown in FIG. 15B. For example, the rounded walls of the chamber 1560 can include or be in thermal contact with an embodiment of the heating element 150. FIG. 15B illustrates an end cross-section view of the vaporizable material 102 having a rounded and/or elliptical shape that can mate with the rounded walls of the chamber 1560 and achieve effective contact therebetween. Such a configuration can allow for efficient use of the vaporizable material 102. For example, distal corners of square or rectangular shaped vaporizable material 102 can be unused or inefficiently used. By eliminating the corners, such as forming the vaporizable material 102 into a rounded and/or elliptical shape, the vaporizable material 102 can be efficiently and effectively used, thereby reducing waste.

Figure 16:
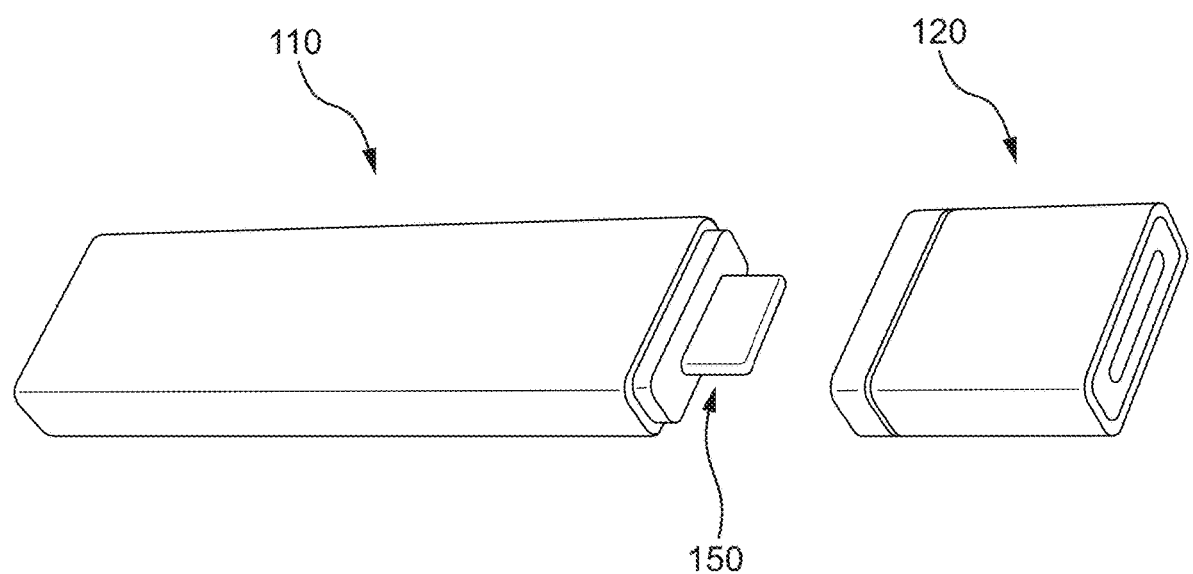
FIG. 16 illustrates a top perspective view of an embodiment of a vaporizer body and vaporizer cartridge, with the vaporizer body including a heating element extending from a distal end of the vaporizer body.

FIG. 16 illustrates a side perspective view of an embodiment of the vaporizer body 110 and vaporizer cartridge 120, with the vaporizer body 110 including a heating element 150 extending from a distal end of the vaporizer body 110. For example, the heating element 150 can extend into the vaporizer cartridge 120 when the vaporizer cartridge 120 is coupled to the vaporizer body 110. As such, the vaporizable material 102 contained in the vaporizer cartridge 120 can be heated by the heating element 150 when the vaporizer cartridge 120 is coupled to the vaporizer body 110. Such a configuration can allow the heating element 150 to be reused with a plurality of vaporizer cartridges 120, as well as reduce assembly time and manufacturing costs associated with the vaporizer cartridge 120.

Figure 17:
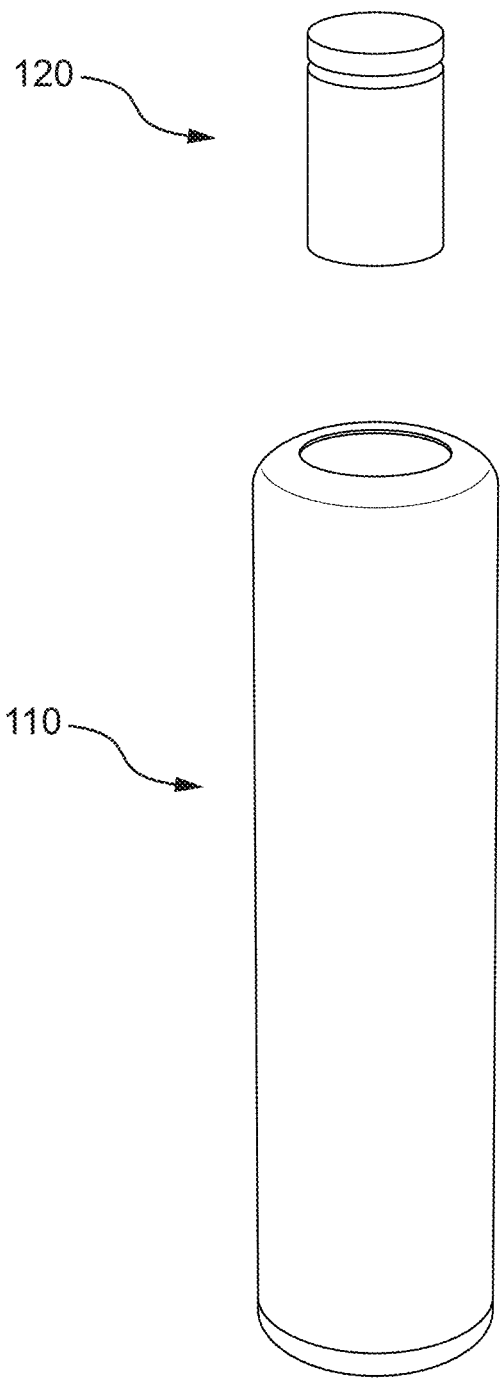
FIG. 17 illustrates a side perspective view of another embodiment of the vaporizer body and vaporizer cartridge, with the vaporizer body and vaporizer cartridge including cylindrical shapes.

FIG. 17 illustrates a side perspective view of another embodiment of the vaporizer body 110 and vaporizer cartridge 120, with the vaporizer body 110 and vaporizer cartridge 120 including cylindrical shapes. The heating element 150 can be included in the cylindrical vaporizer cartridge 120 and/or in the cylindrical vaporizer body 110. In some embodiments, the vaporizer body 110 can include a cylindrical cartridge receptacle for releasably coupling the vaporizer cartridge 120 therein.

Figure 18:
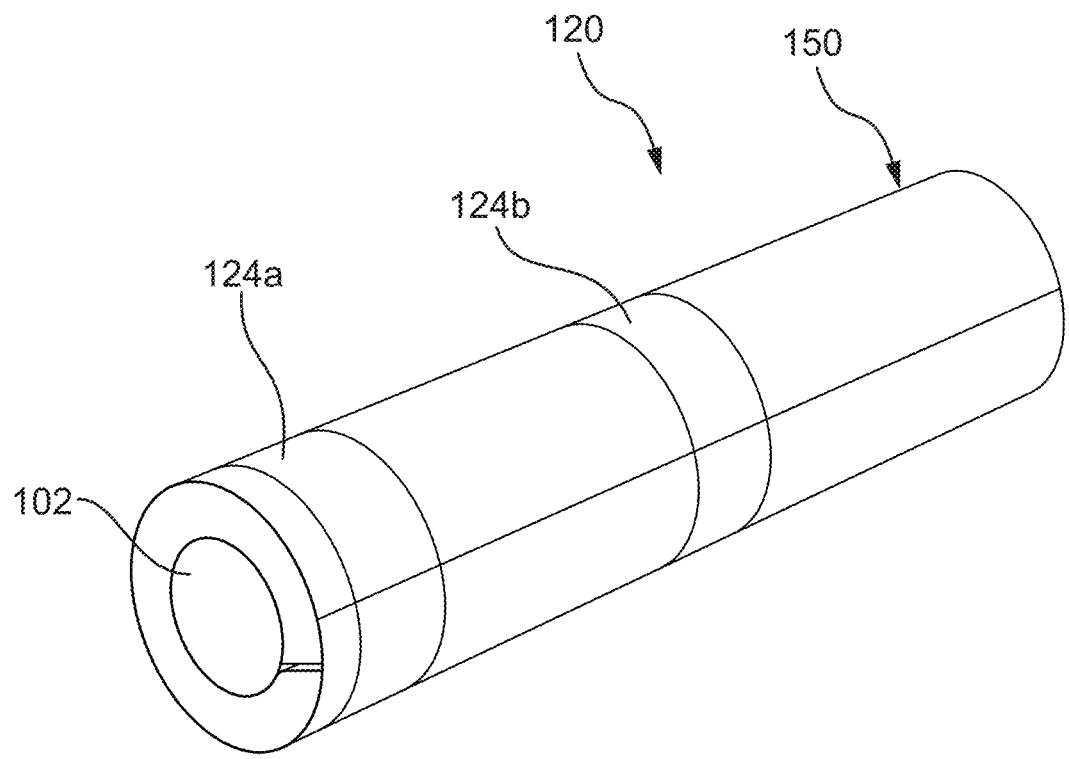
FIG. 18 illustrates an embodiment of the vaporizer cartridge including vaporizable material formed in a cylindrical shape and at least one electrical contact extending around a circumference of the formed vaporizable material.

FIG. 18 illustrates a side perspective view of another embodiment of the vaporizer cartridge 120, with the vaporizer cartridge 120 including a cylindrical shape. The heating element 150 can be included in the cylindrical vaporizer cartridge 120 for heating the vaporizable material 102 contained in the vaporizer cartridge 120.

As shown in FIG. 18, the vaporizer cartridge 120 can include a pair of cartridge contacts 124a and 124b extending around an outer cylindrical surface of the vaporizer cartridge 120. The cartridge contacts 124a and 124b can be made out of a thermally and electrically conductive material. For example, the cylindrical vaporizer cartridge 120 can be inserted into a cylindrical embodiment of the cartridge receptacle of the vaporizer body 110. The receptacle contacts 125a, 125b can couple with the cartridge contacts 124a, 124b to provide power from the power source 112 of the vaporizer body 110 to the heating element 150 that is in electrical communication with and/or includes the cartridge contacts 124a, 124b. The cylindrical vaporizer cartridge 120 can include an internal heating element 150 that can heat, including vaporize, the vaporizable material 102 of the cylindrical vaporizer cartridge 120. Other shapes of the vaporizer cartridge 120 are within the scope of this disclosure.

Figure 19:
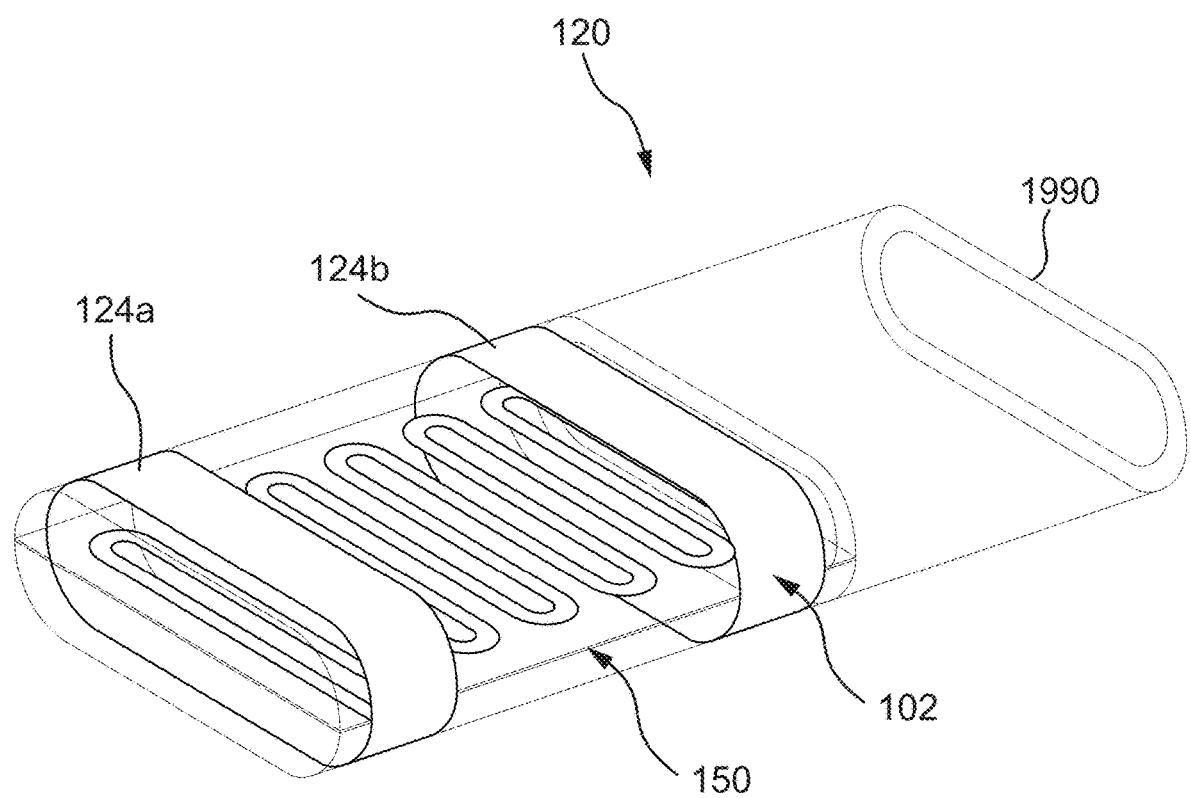
FIG. 19 illustrates another embodiment of the vaporizer cartridge including vaporizable material formed in a rectangular shape and at least one electrical contact extending around a circumference of the formed vaporizable material.

FIG. 19 illustrates another embodiment of a vaporizer cartridge 120 having a rectangular shape with rounded sides and at least one cartridge contact 124a, 124b extending around a circumference of the vaporizer cartridge 120. Furthermore, the vaporizer cartridge 120 can include an internal heating element 150, such as any of the heating elements 150 described herein positioned within and/or surrounded by vaporizable material 102. The cartridge contacts 124a, 124b extending around the vaporizer cartridge 120 can be in electrical and/or thermal communication with the heating element 150. As shown in FIG. 19, the vaporizer cartridge 120 can include a mouthpiece 1990 that a user can interact with for drawing out inhalable aerosol for inhalation.

The heating element 150 can be made out of a variety of materials, including various metals (e.g., stainless steel, iron, nickel, zirconium, titanium). In some embodiments, the heating element 150 can include a heating coil made out of a stainless steel 316 wire (e.g., with a diameter of approximately 0.3 mm to 0.8 mm). In some embodiments, the heating element 150 can have a resistance of approximately 0.2 Ohms to 0.5 Ohms. In some embodiments, the heating element 150 can heat up (e.g., from approximately room temperature) to within a desired temperature range (e.g., the threshold temperature range) in approximately 0.1 seconds to approximately 0.3 seconds. In some embodiments, the heating element 150 can have an approximately 7.8 J heating capacity. Other embodiments of the heating element 150 are within the scope of this disclosure.

Terminology

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example, as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:
1. A system for generating an inhalable aerosol, the system comprising:
   a cartridge comprising:
      a non-liquid vaporizable material; and a heating element configured to heat the non-liquid vaporizable material within a predefined temperature range to generate the inhalable aerosol, the heating element containing the non-liquid vaporizable material; and a vaporizer device body comprising:
  a power source configured to supply power to the heating element when the cartridge is coupled to the vaporizer device body; wherein the heating element comprises an electrically conductive sheet, the electrically conductive sheet comprises at least one side extension forming cartridge contacts that are positioned to mate with a receptacle contact of the vaporizer device body and thereby adapted to allow current to flow from the power source to the heating element.

2. The system of claim 1, wherein the heating element is rolled into a spiral formation with the non-liquid vaporizable material contained within the spiral formation.

3. The system of claim 1, wherein the electrically conductive sheet comprises a plurality of resistive heaters.

4. The system of claim 1, wherein the electrically conductive sheet includes a plurality of perforations configured to affect a resistance along the electrically conductive sheet.

5. The system of claim 1, wherein the vaporizer device body further includes a receptacle with rounded walls that receives the non-liquid vaporizable material formed into a condensed rounded or elliptical shape.

6. The system of claim 1, wherein the non-liquid vaporizable material is formed into a condensed cylindrical shape and the heating element includes at least one electrical contact extending around an outer surface of the cartridge, the at least one electrical contact providing an electrical pathway between the power source of the vaporizer device body and the heating element.

7. The system of claim 1, wherein the heating element further comprises an electrically resistive foam structure comprising a plurality of cells that are each configured to contain a part of the non-liquid vaporizable material.

8. The system of claim 1, wherein the predefined temperature range is approximately 25 degrees Celsius to approximately 250 degrees Celsius.

9. The system of claim 1, wherein the non-liquid vaporizable material comprises a tobacco material.

10. The system of claim 1, wherein the vaporizer device body further comprises a receptacle configured to releasably couple the cartridge.

11. A system for generating an inhalable aerosol, the system comprising:
  a cartridge comprising:
    a non-liquid vaporizable material;
    a chamber containing the non-liquid vaporizable material; and
    a heating element configured to heat the non-liquid vaporizable material within a predefined temperature range to generate the inhalable aerosol, the heating element extending within the chamber and into the non-liquid vaporizable material to allow three-dimensional heating of the non-liquid vaporizable material, wherein the heating element comprises at least one single spiral component, the at least one single spiral component being formed of an electrically conductive material, a thermally conductive material, or both; and
  a vaporizer device body comprising:
    a power source configured to supply power to the heating element when the cartridge is coupled to the vaporizer device body.

12. The system of claim 11, wherein the heating element comprises a pair of spiral conductive components that are formed of an electrically conductive material, a thermally conductive material, or both.

13. The system of claim 11, wherein the heating element is in electrical communication with at least one electrical contact extending around an outer surface of the cartridge.

14. The system of claim 11, wherein the predefined temperature range is approximately 25 degrees Celsius to approximately 250 degrees Celsius.

15. The system of claim 11, wherein the non-liquid vaporizable material comprises a tobacco material.

16. The system of claim 11, wherein the vaporizer device body further comprises a receptacle configured to releasably couple the cartridge.

17. The system of claim 11, wherein the heating element further comprises a pair of cartridge contacts coupled to the at least one single spiral component.

18. The system of claim 17, wherein the pair of cartridge contacts are coupled to opposing ends of the at least one single spiral component.

19. The system of claim 11, wherein the at least one single spiral component extends along a length of the chamber.

* * * * *